US010089868B1

(12) United States Patent
Hayward

(10) Patent No.: US 10,089,868 B1
(45) Date of Patent: *Oct. 2, 2018

(54) DETERMINING ABNORMAL TRAFFIC CONDITIONS FROM A BROADCAST OF TELEMATICS DATA ORIGINATING FROM ANOTHER VEHICLE

(71) Applicant: STATE FARM MUTUAL AUTOMOBILE INSURANCE COMPANY, Bloomington, IL (US)

(72) Inventor: Gregory L. Hayward, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,305

(22) Filed: Oct. 18, 2017

Related U.S. Application Data

(63) Continuation of application No. 14/989,979, filed on Jan. 7, 2016, now Pat. No. 9,836,962.
(Continued)

(51) Int. Cl.
*G08G 1/01* (2006.01)
*G01C 21/36* (2006.01)
(Continued)

(52) U.S. Cl.
CPC ....... *G08G 1/0141* (2013.01); *G01C 21/3691* (2013.01); *G05D 1/0088* (2013.01);
(Continued)

(58) Field of Classification Search
CPC .. G08G 1/0141; G08G 1/0112; G08G 1/0125; G08G 1/091; G08G 1/096827;
(Continued)

(56) References Cited

U.S. PATENT DOCUMENTS

| 6,437,688 | B1 | 8/2002 | Kobayashi | |
| 8,935,036 | B1* | 1/2015 | Christensen | G07C 5/008 701/29.1 |

(Continued)

OTHER PUBLICATIONS

U.S. Appl. No. 14/798,609, Methods of Providing Insurance Savings Based Upon Telematics and Anonymous Driver Data, filed Jul. 14, 2015.
(Continued)

*Primary Examiner* — Yuen H Wong
(74) *Attorney, Agent, or Firm* — Marshall, Gerstein & Borun LLP; Randall G. Rueth

(57) ABSTRACT

A computer-implemented method of using telematics data at a destination device is provided. The destination device may be a mobile device associated with a driver, or a smart vehicle controller of a destination vehicle. The telematics data is generated by an originating mobile device (i) having a Telematics Application (or "App"), and (ii) associated with a second driver/vehicle, the telematics data including acceleration, braking, speed, heading, and location data associated with an originating vehicle. The telematics data may be broadcast from the originating mobile device to the destination device that (a) analyzes the telematics data received, (b) determines that an abnormal travel condition exists, and (c) automatically take corrective action that alleviates a negative impact of the abnormal travel condition on the destination vehicle to facilitate safer travel. A usage-based or other insurance discount may be provided based upon insured usage of the telematics data-based risk mitigation or prevention functionality.

20 Claims, 10 Drawing Sheets

Related U.S. Application Data

(60) Provisional application No. 62/250,286, filed on Nov. 3, 2015, provisional application No. 62/247,334, filed on Oct. 28, 2015, provisional application No. 62/232,035, filed on Sep. 24, 2015, provisional application No. 62/232,045, filed on Sep. 24, 2015, provisional application No. 62/232,054, filed on Sep. 24, 2015, provisional application No. 62/232,050, filed on Sep. 24, 2015, provisional application No. 62/232,065, filed on Sep. 24, 2015, provisional application No. 62/232,097, filed on Sep. 24, 2015, provisional application No. 62/232,083, filed on Sep. 24, 2015, provisional application No. 62/232,075, filed on Sep. 24, 2015, provisional application No. 62/232,090, filed on Sep. 24, 2015, provisional application No. 62/207,561, filed on Aug. 20, 2015, provisional application No. 62/204,749, filed on Aug. 13, 2015, provisional application No. 62/113,749, filed on Feb. 9, 2015, provisional application No. 62/105,468, filed on Jan. 20, 2015.

(51) Int. Cl.
| | | |
|---|---|---|
| *G08G 1/0968* | | (2006.01) |
| *G08G 1/09* | | (2006.01) |
| *G08G 1/052* | | (2006.01) |
| *G05D 1/00* | | (2006.01) |

(52) U.S. Cl.
CPC ......... *G08G 1/0112* (2013.01); *G08G 1/0125* (2013.01); *G08G 1/052* (2013.01); *G08G 1/091* (2013.01); *G08G 1/096827* (2013.01); *G08G 1/096844* (2013.01); *G08G 1/096855* (2013.01)

(58) Field of Classification Search
CPC ....... G08G 1/096844; G08G 1/096855; G08G 1/052; G05D 1/0088; G01C 21/3691
See application file for complete search history.

(56) References Cited

U.S. PATENT DOCUMENTS

| | | | |
|---|---|---|---|
| 9,047,778 | B1* | 6/2015 | Cazanas ................. G08G 1/166 |
| 9,129,449 | B2 | 9/2015 | Davidson |
| 9,679,487 | B1 | 6/2017 | Hayward |
| 2007/0054685 | A1 | 3/2007 | Kellum |
| 2007/0159354 | A1 | 7/2007 | Rosenberg |
| 2010/0015963 | A1 | 1/2010 | Hesse et al. |
| 2010/0191391 | A1 | 7/2010 | Zeng |
| 2010/0286864 | A1 | 11/2010 | Kawauchi et al. |
| 2013/0030642 | A1 | 1/2013 | Bradley et al. |
| 2013/0090139 | A1 | 4/2013 | McHenry et al. |
| 2013/0169812 | A1 | 7/2013 | Lu et al. |
| 2014/0081675 | A1 | 3/2014 | Ives et al. |
| 2014/0320260 | A1 | 10/2014 | Van Wiemeersch et al. |
| 2015/0077236 | A1 | 3/2015 | Le Masurier |
| 2015/0145995 | A1 | 5/2015 | Shahraray et al. |
| 2015/0179062 | A1* | 6/2015 | Ralston .................. G01C 21/26 701/117 |
| 2015/0262487 | A1 | 9/2015 | Cazanas et al. |
| 2016/0021178 | A1 | 1/2016 | Liu et al. |
| 2016/0232791 | A1 | 8/2016 | Tosa et al. |
| 2016/0277601 | A1 | 9/2016 | Seymour |
| 2016/0334227 | A1 | 11/2016 | Davidson |

OTHER PUBLICATIONS

U.S. Appl. No. 14/798,615, Methods of Providing Insurance Savings Based Upon Telematics and Driving Behavior Identification, filed Jul. 14, 2015.

U.S. Appl. No. 14/798,626, Methods of Providing Insurance Savings Based Upon Telematics and Usage-Based Insurance, filed Jul. 14, 2015.
U.S. Appl. No. 14/798,633, Methods of Providing Insurance Savings Based Upon Telematics and Insurance Incentives, filed Jul. 14, 2015.
U.S. Appl. No. 14/798,741, Methods of Determining Accident Cause and/or Fault Using Telematics Data, filed Jul. 14, 2015.
U.S. Appl. No. 14/798,745, Methods of Reconstructing an Accident Scene Using Telematics Data, filed Jul. 14, 2015.
U.S. Appl. No. 14/798,750, Methods of Insurance Claim Buildup Detection Using Telematics Data, filed Jul. 14, 2015.
U.S. Appl. No. 14/798,757, Methods of Facilitating Emergency Assistance, filed Jul. 14, 2015.
U.S. Appl. No. 14/798,763, Methods of Intelligent Routing, filed Jul. 14, 2015.
U.S. Appl. No. 14/798,769, Methods of Theft Prevention or Mitigation, filed Jul. 14, 2015.
U.S. Appl. No. 14/798,770, Methods of Pre-Generating Insurance Claims, filed Jul. 14, 2015.
U.S. Appl. No. 14/989,946, Alert Notifications Utilizing Broadcasted Telematics Data, filed Jan. 7, 2016.
U.S. Appl. No. 14/989,946, Nonfinal Office Action, dated Dec. 9, 2016.
U.S. Appl. No. 14/989,946, Notice of Allowance, dated Mar. 17, 2017.
U.S. Appl. No. 14/989,950, Advisory Action, dated Jun. 21, 2017.
U.S. Appl. No. 14/989,950, Broadcasting Telematics Data to Nearby Mobile Computing Devices, Vehicles, and Infrastructure, filed Jan. 7, 2016.
U.S. Appl. No. 14/989,950, Final Office Action, dated Apr. 19, 2017.
U.S. Appl. No. 14/989,950, Nonfinal Office Action, dated Nov. 18, 2016.
U.S. Appl. No. 14/989,950, Notice of Allowance, dated Sep. 12, 2017.
U.S. Appl. No. 14/989,979, Advisory Action, dated Jun. 26, 2017.
U.S. Appl. No. 14/989,979, Determining Abnormal Traffic Conditions from a Broadcast of Telematics Data Originating from Another Vehicle, filed Jan. 7, 2016.
U.S. Appl. No. 14/989,979, Final Office Action, dated Apr. 24, 2017.
U.S. Appl. No. 14/989,979, Nonfinal Office Action, dated Nov. 30, 2016.
U.S. Appl. No. 14/989,979, Notice of Allowance, dated Sep. 14, 2017.
U.S. Appl. No. 14/989,990, Taking Corrective Action Based Upon Telematics Data Broadcast from Another Vehicle, filed Jan. 7, 2016.
U.S. Appl. No. 14/990,056, Advisory Action, dated Jul. 6, 2017.
U.S. Appl. No. 14/990,056, Analyzing Telematics Data to Determine Travel Events and Corrective Actions, filed Jan. 7, 2016.
U.S. Appl. No. 14/990,056, Final Office Action, dated Apr. 21, 2017.
U.S. Appl. No. 14/990,056, Nonfinal Office Action, dated Dec. 1, 2016.
U.S. Appl. No. 14/990,056, Notice of Allowance, dated Sep. 13, 2017.
U.S. Appl. No. 14/990,073, Providing Insurance Discounts Based Upon Usage of Telematics Data-Based Risk Mitigation and Prevention Functionality, filed Jan. 7, 2016.
U.S. Appl. No. 14/990,116, Notice of Allowance, dated Sep. 13, 2017.
U.S. Appl. No. 14/990,116, Advisory Action, dated Jun. 28, 2017.
U.S. Appl. No. 14/990,116, Determining Corrective Actions Based Upon Broadcast of Telematics Data Originating From Another Vehicle, filed Jan. 7, 2016.
U.S. Appl. No. 14/990,116, Final Office Action, dated Apr. 19, 2017.
U.S. Appl. No. 14/990,116, Nonfinal Office Action, dated Nov. 25, 2016.
U.S. Appl. No. 14/990,121, Advisory Action, dated Jul. 17, 2017.
U.S. Appl. No. 14/990,121, Facilitating Safer Vehicle Travel Utilizing Telematics Data, filed Jan. 7, 2016.
U.S. Appl. No. 14/990,121, Final Office Action, dated Apr. 19, 2017.
U.S. Appl. No. 14/990,121, Nonfinal Office Action, dated Dec. 15, 2016.
U.S. Appl. No. 14/990,139, Final Office Action, dated Apr. 19, 2017.

(56) References Cited

OTHER PUBLICATIONS

U.S. Appl. No. 14/990,139, Nonfinal Office Action, dated Nov. 18, 2016.
U.S. Appl. No. 14/990,139, Using Train Telematics Data to Reduce Accident Risk, filed Jan. 7, 2016.
U.S. Appl. No. 14/990,165, Final Office Action, dated Apr. 19, 2017.
U.S. Appl. No. 14/990,165, Nonfinal Office Action, dated Nov. 23, 2016.
U.S. Appl. No. 14/990,165, Using Train Telematics Data to Provide Information in One or More Vehicles to Reduce Accident Risk, filed Jan. 7, 2016.
U.S. Appl. No. 14/990,209, Final Office Action, dated Apr. 20, 2017.
U.S. Appl. No. 14/990,209, Nonfinal Office Action, dated Nov. 18, 2016.
U.S. Appl. No. 14/990,209, Using Emergency Response System (EMS) Vehicle Telematics Data to Reduce Accident Risk, filed Jan. 7, 2016.
U.S. Appl. No. 14/990,228, Broadcasting Information Related to Hazards Impacting Vehicle Travel, filed Jan. 7, 2016.
U.S. Appl. No. 14/990,228, Final Office Action, dated Apr. 20, 2017.
U.S. Appl. No. 14/990,228, Nonfinal Office Action, dated Dec. 15, 2016.
U.S. Appl. No. 15/484,791, Alert Notifications Utilizing Broadcasted Telematics Data, filed Apr. 11, 2017.
U.S. Appl. No. 15/484,791, Nonfinal Office Action, dated Oct. 18, 2017.

\* cited by examiner

DETERMINING ABNORMAL TRAFFIC CONDITIONS FROM A BROADCAST OF TELEMATICS DATA ORIGINATING FROM ANOTHER VEHICLE

CROSS REFERENCE TO RELATED APPLICATIONS

This application is a continuation of U.S. patent application Ser. No. 14/989,979, filed Jan. 7, 2016, which claims the benefit of (1) U.S. Provisional Patent Application No. 62/105,468, entitled "Broadcasting Telematics Data To Nearby Mobile Computing Devices, Vehicles, and Infrastructure," filed Jan. 20, 2015, (2) U.S. Provisional Patent Application No. 62/113,749, entitled "Broadcasting Telematics Data To Nearby Mobile Computing Devices, Vehicles, and Infrastructure," filed Feb. 9, 2015, (3) U.S. Provisional Patent Application No. 62/204,749, entitled "Broadcasting Telematics Data To Nearby Mobile Computing Devices, Vehicles, and Infrastructure," filed Aug. 13, 2015, (4) U.S. Provisional Patent Application No. 62/207,561, entitled "Generating Alert Notifications By Broadcasting Telematics Data To Nearby Mobile Computing Devices, Vehicles, and Infrastructure," filed Aug. 20, 2015, (5) U.S. Provisional Patent Application No. 62/232,035 entitled "Generating Alert Notifications By Broadcasting Telematics Data To Nearby Mobile Computing Devices, Vehicles, and Infrastructure," filed Sep. 24, 2015, (6) U.S. Provisional Patent Application No. 62/232,045, entitled "Generating Alert Notifications By Broadcasting Telematics Data To Nearby Mobile Computing Devices, Vehicles, and Infrastructure," filed Sep. 24, 2015, (7) U.S. Provisional Patent Application No. 62/232,050, entitled "Determining Abnormal Traffic Conditions From A Broadcast Of Telematics Data Originating From Another Vehicle," filed Sep. 24, 2015, (8) U.S. Provisional Patent Application No. 62/232,054, entitled "Taking Corrective Action Based Upon Telematics Data Broadcast From Another Vehicle," filed Sep. 24, 2015, (9) U.S. Provisional Patent Application No. 62/232,065, entitled "Analyzing Telematics Broadcast To Determine Travel Events and Corrective Actions," filed Sep. 24, 2015, (10) U.S. Provisional Patent Application No. 62/232,075, entitled "Providing Insurance Discounts Based Upon Usage Of Telematics Data-Based Risk Mitigation And Prevention Functionality," filed Sep. 24, 2015, (11) U.S. Provisional Patent Application No. 62/232,083, entitled "Determining Corrective Actions Based Upon Broadcast Of Telematics Data Originating From Another Vehicle," filed Sep. 24, 2015, (12) U.S. Provisional Patent Application No. 62/232,090, entitled "Determining Corrective Actions Based Upon Telematics Data Broadcast From Another Vehicle," filed Sep. 24, 2015, (13) U.S. Provisional Patent Application No. 62/232,097, entitled "Generating Alert Notifications By Broadcasting Train Telematics Data To Nearby Mobile Computing Devices, Vehicles, and Infrastructure," filed Sep. 24, 2015, (14) U.S. Provisional Patent Application No. 62/247,334, entitled "Generating Alert Notifications By Broadcasting Train Telematics Data To Nearby Mobile Computing Devices, Vehicles, and Infrastructure," filed Oct. 28, 2015, and (15) U.S. Provisional Patent Application No. 62/250,286, entitled "Generating Alert Notifications By Broadcasting Train Telematics Data To Nearby Mobile Computing Devices, Vehicles, and Infrastructure," filed Nov. 3, 2015, the disclosure of each of which is hereby expressly incorporated by reference herein in its entirety.

FIELD OF THE DISCLOSURE

The present disclosure generally relates to generating alert notifications and, more particularly, to generating alert notifications based upon transmitting and collecting telematics data for use by other drivers.

BACKGROUND

Conventional telematics devices may collect certain types of data regarding vehicle operation. However, conventional telematics devices and data gathering techniques may have several drawbacks.

BRIEF SUMMARY

In one aspect, telematics data and/or geographic location data may be collected, monitored, measured, and/or generated by one or more computing devices associated with a vehicle. The telematics data may include various metrics that indicate the direction, speed, and/or motion of the vehicle in which the data is associated. The geographic location data may include a geographic location of the vehicle, such as latitude and longitude coordinates, for example. The one or more computing devices may include a mobile computing device positioned within the vehicle, an on-board computer integrated within the vehicle, and/or a combination of these devices working in conjunction with one another. The one or more computing devices may broadcast the telematics data and/or the geographic location data to one or more other devices.

The telematics data and/or the geographic location data may be received and/or processed by one or more other computing devices to determine whether an anomalous condition exists, such as a traffic accident, for example. These one or more other computing devices may be external computing devices (e.g., a remote server), another mobile computing device, a smart traffic infrastructure device (e.g., a smart traffic light), etc. If an anomalous condition is detected, the geographic location of the vehicle associated with the telematics data may be used as a condition to decide whether to generate an alert at (or send an alert notification to) the one or more other computing devices associated with nearby vehicles.

In one aspect, a computer-implemented method of using telematics data may be provided. The method may include: (a) receiving telematics data, at or by (1) a destination mobile device associated with a driver (or an associated transceiver of the destination mobile device), or (2) a smart vehicle controller (or an associated transceiver) of a destination vehicle associated with the driver, via wireless communication and/or data transmission (or otherwise via a secure electronic communication network requiring login credential electronic verification), the telematics data being generated by an originating mobile device. The originating mobile device: (i) having a Telematics Application (or "App") installed or stored locally in a non-transitory computer-readable memory unit, and/or (ii) is associated with the driver, the telematics data including acceleration, braking, speed, heading, and location data associated with the operation of an originating vehicle. The method may also include (b) analyzing the telematics data, at or via the destination mobile device or the smart vehicle controller (or a processor associated therewith); (c) determining, at or via the destination mobile device or the smart vehicle controller (or an associated processor), that an abnormal travel condition (or traffic event) exists from the analysis of the telematics data received from the originating mobile device having the Telematics App; and/or (d) when the abnormal travel condition (or traffic event) exists, automatically taking or generating a preventive or corrective action, at or via the destination mobile device or the smart vehicle controller (or an associated processor), that alleviates a negative impact of the abnormal travel condition (or traffic event) on the driver and/or the destination vehicle to facilitate safer and/or more efficient vehicle travel. The method may include additional, less, or alternate functionality, including that discussed elsewhere herein.

For instance, the abnormal condition may be based upon, or otherwise determined from processor analysis of the telematics data received from the originating mobile device having the Telematics App, and that reveals that the originating vehicle is, or may likely be, experiencing high traffic conditions, congestion, road construction, or extreme weather conditions. The telematics data may (1) be generated and/or collected by the originating mobile device (or an associated processor) associated with an originating driver, and (2) include speed, acceleration, deceleration, GPS location, lane information, and/or other data of, or associated with, the originating vehicle. Additionally or alternatively, the telematics data may (1) be generated and/or collected by the originating mobile device (or an associated processor) associated with an originating driver, and (2) include time, braking, acceleration, left turn, right turn, heading, GPS (Global Positioning System) speed, GPS latitude and longitude, gyroscope, battery level, and/or telephone usage information or data of, or associated with, the originating vehicle.

The preventive or corrective action taken may be: (i) generating or determining an alert, at or via the destination mobile device or smart vehicle controller (or an associated processor); (ii) presenting a visual alert, at or via the destination mobile device or smart vehicle controller, on a display or display screen associated with the destination mobile device or smart vehicle controller, respectively; and/or (iii) providing an audio or audible alert, at or via the destination mobile device or smart vehicle controller (or an associated processor). The alert may be presented or provided only after the destination mobile device or smart vehicle controller determines that the abnormal travel condition (or traffic event) is relevant to the destination vehicle, such as by determining that a location of the abnormal travel condition (or traffic event) is in the vicinity of the destination vehicle and/or along a route that the destination vehicle is presently traveling.

The preventive or corrective action taken may be: (a) generating, determining, and/or receiving an alternate travel route that avoids a GPS location of the travel or traffic event, at or via the destination mobile device or smart vehicle controller; and/or (b) presenting the alternative travel route, at or via the destination mobile device or smart vehicle controller, on a display or display screen for use by the driver; and/or providing audio driving directions for the destination vehicle to travel along the alternate route. Additionally or alternatively, the preventive or corrective action taken may be: (c) generating, determining, and/or receiving an alternate travel route that avoids a GPS location of the travel or traffic event, at or via the destination mobile device or smart vehicle controller; and/or (d) automatically directing the destination vehicle to take or follow the alternative travel route, at or via the destination mobile device or smart vehicle controller, wherein the destination vehicle is an autonomous or semi-autonomous vehicle that drives itself (via one or more processors) along the alternate travel route.

The telematics data may be (1) generated and/or collected by the originating mobile device (or the Telematics App executing thereon), and (2) transmitted from a transceiver mounted on, or within, the originating mobile device indirectly or directly to destination mobile device or smart vehicle controller via peer-to-peer (P2P) wireless communication and/or data transmission, or via a secure electronic communication network, the telematics data being repeatedly broadcast from the transceiver mounted on, or within, the originating mobile device at least every few seconds. Additionally or alternatively, the telematics data may be (3) transmitted from the originating mobile device directly to a remote server (such as an insurance provider remote server), and then relayed or transmitted from the remote server to the destination mobile device or smart vehicle controller via wireless communication and/or data transmission; and/or (4) transmitted from the originating mobile device directly to smart infrastructure (such as a smart stop sign, smart street sign, smart toll both, and/or smart road-side equipment, markers, or reflectors), and then relayed or transmitted from the smart infrastructure to the destination mobile device or smart vehicle controller via wireless communication or data transmission. The telematics data may be repeatedly broadcast from the transceiver mounted on, or within, the originating mobile device at least every few seconds, such as when it has new data to transmit, or when driving conditions have changed.

The method may also include, with customer permission or affirmative consent, (i) determining or identifying, by one or more processors associated with an insurance provider remote server, an insured customer having a mobile device configured with the telematics data-based risk mitigation or prevention functionality discussed herein and/or the Telematics App (or is otherwise capability of receiving and then analyzing the telematics data as explained herein); (ii) monitoring, by the one or more processors associated with the remote server, a time amount and/or mileage amount that the insured customer drives an insured vehicle with the risk mitigation or prevention functionality discussed herein, or the Telematics App, enabled and/or executing on their mobile device; and/or (iii) adjusting or modifying, by the one or more processors associated with the remote server, an insurance policy, premium, or discount for the insured customer based upon their usage and/or amount that they use, or employ, the risk mitigation or prevention functionality and/or Telematics App, such as generating a usage-based discount that is tied to an amount that the risk mitigation or prevention functionality (including the capability of receiving and analyzing the telematics data as discussed herein, and/or generating appropriate alerts or recommendations) is used.

In one aspect, a computer-implemented method of using telematics data at a first vehicle that receives telematics data associated with a second vehicle is provided. The method may include one or more processors of a destination mobile computing device or a smart vehicle controller associated with the first vehicle and a first driver (1) receiving telematics data that is generated by an originating mobile computing device associated with the second vehicle and a second driver, the originating mobile computing device executing a Telematics Application (or "App") installed or stored thereon to facilitate the generation of the telematics data; (2) analyzing the telematics data; and (3) determining whether an abnormal travel or traffic event exists from the analysis of the telematics data. The telematics data may include data related to a location of the second vehicle and an acceleration, braking, speed, and heading of the second vehicle. Furthermore, the method may include, when the abnormal travel or traffic event exists, the destination mobile computing device or the smart vehicle controller associated with the first vehicle automatically taking a preventive or corrective action, which alleviates a negative impact of the abnormal travel or traffic event on the first driver or the first vehicle to facilitate safer or more efficient travel.

In another aspect, a destination computer system is provided. The destination computer system may be configured to use telematics data and included a destination mobile computing device associated with a first driver, or a smart vehicle controller of a destination vehicle associated with the first driver, either or both of which may be configured to: (1) receive telematics data; (2) determine whether an abnormal travel condition or traffic event exists from an analysis of the telematics data received from the originating mobile computing device; and (3) determine whether the abnormal travel condition or traffic event is along a route that the destination vehicle is currently traveling or ahead of a direction of travel of the destination vehicle. The telematics data may be generated by an originating mobile computing device associated with a second driver and an originating vehicle, the originating mobile computing device executing a Telematics Application (or "App") installed or stored thereon to facilitate the generation of the telematics data. The telematics data may include data related to a location of the originating vehicle and an acceleration, braking, speed, and heading of the originating vehicle.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
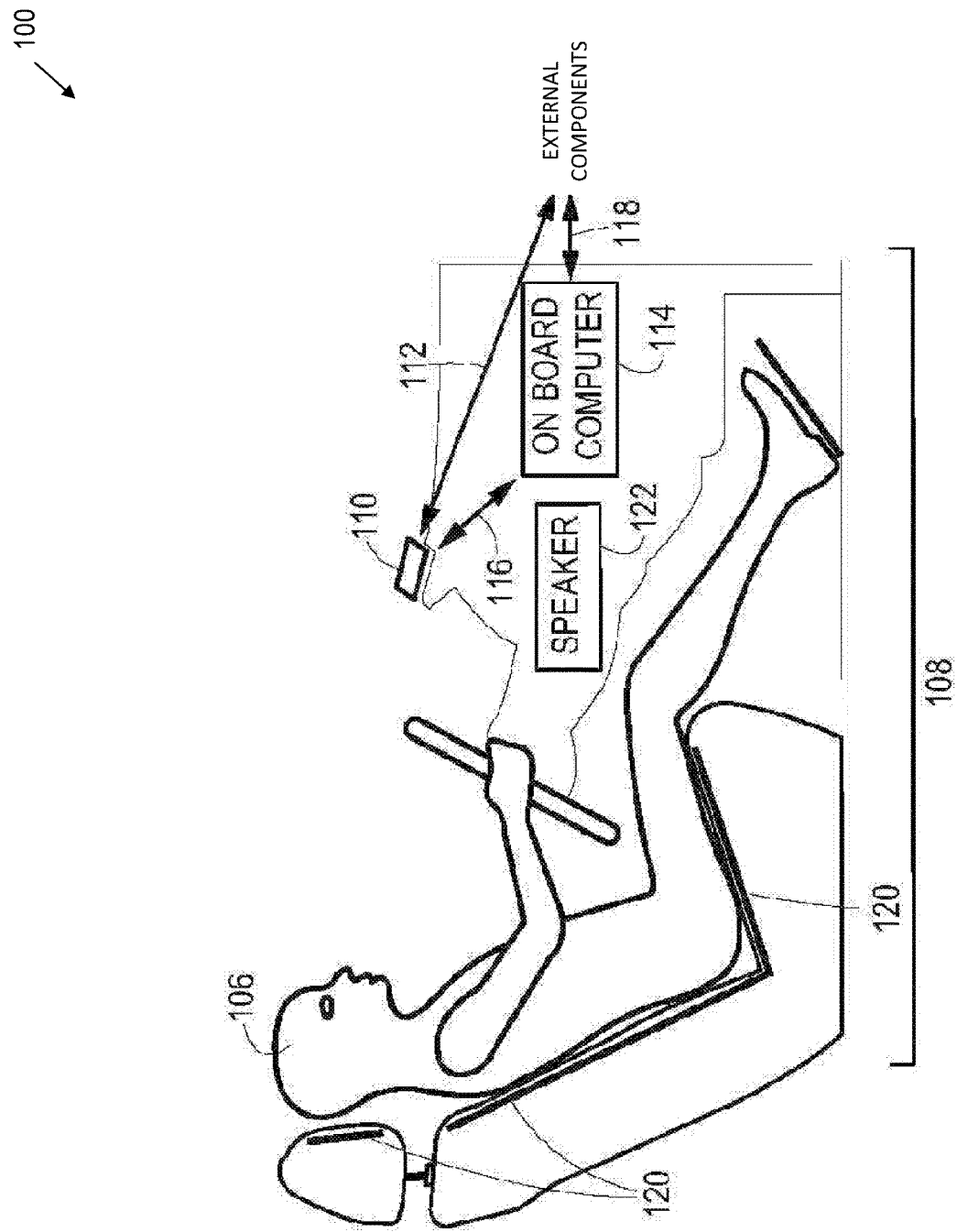
FIG. 1 illustrates a block diagram of an exemplary telematics collection system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition is detected at the location of a vehicle using one or more computing devices within or otherwise associated with the vehicle. If the detected anomalous condition may impact or affect another vehicle on the road, embodiments are described to generate and/or send alert notifications to other vehicles that may be so affected. As further described throughout the disclosure, the process of detecting anomalous conditions and whether they apply to other vehicles may be performed through an analysis geographic location data and/or telematics data broadcasted from one or more computing devices within or otherwise associated with one or more respective vehicles.

The present embodiments may relate to collecting, transmitting, and/or receiving telematics data; and may include a mobile computing device (e.g., a "mobile device" such as a smart phone, tablet, phablet, smart watch, wearable electronics, or other computing devices configured for Radio Frequency communication and data transmission), a vehicle-mounted processor, computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily re-routed, unexpected bad weather, other drivers or vehicles, etc.

To address these and other problems, telematics data (and/or driver behavior or vehicle information) may be captured in real-time, or near real-time, by a mobile device of a vehicle driver (or passenger). The mobile device may be specifically configured for gathering, collecting, and/or generating telematics and/or other data as a vehicle is traveling.

For instance, the mobile device may be equipped with (i) various sensors and/or meters capable of generating telematics data (GPS unit, speed sensor, speedometer, odometer, gyroscope, compass, accelerometer, etc.) and/or (ii) an application, such as a Telematics Data Application or Telematics "App," that includes computer instructions and/or software modules stored in a non-transitory memory unit that control collecting and generating telematics and/or other data. The mobile device and/or the application (or Telematics App) may provide a software module, user interface, and/or interactive display screen configured to facilitate the data collection. The mobile device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or smart infrastructure—all of which may be equipped with its own Telematics App or other telematics related applications. The Telematics App may include other functionality, including the mobile device functionality discussed elsewhere herein.

Alternatively, the mobile device may remotely access a web page, such as via wireless communication with a remote server. The web page may provide the mobile device with the functionality to collect the telematics and/or other data as the vehicle is moving. Additionally or alternatively, the web page may allow the mobile device to upload or transmit data in real-time, or near real-time, to a mobile device of a second driver, a remote server, smart infrastructure, and/or another (smart) vehicle.

Additionally or alternatively, a smart vehicle controller or processor may be configured with the same functionality as that of the mobile device described above. For instance, a smart vehicle controller may include an application, software module, or computer instructions that provide for the telematics and/or other data collection and generation functionality discussed herein. The smart vehicle controller may be in wired or wireless communication with various ("smart" or "dumb") vehicle-mounted meters, sensors, and/or detectors, such as speedometers, speed sensors, compasses, gyros, accelerometers, etc. that collect and/or generate telematics data and/or other data detailing or associated with vehicle operation, and/or driving or driver behavior.

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/vehicle data in real-time as the vehicle is traveling, such as via a Telematics App running on the mobile device. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The mobile device itself (and/or Telematics App) may be configured to identify the type of traffic event and transmit the type of traffic event to other mobile devices, a remote server, smart vehicles, and/or smart infrastructure. In one embodiment, the mobile device (and/or Telematics App) may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

In one embodiment, a telematics application or software module (e.g., the Telematics App as discussed herein) may be designed to communicate with smart vehicles and smart infrastructure. An advantage of this is that for a vehicle owner that does not have a "smart" vehicle with wireless communication technology, the application and/or software module deployed on a smart phone or other mobile device may communicate with smart vehicles and infrastructure (and/or remote servers and other mobile devices). The telematics application and/or software module may be programmed to provide voice alerts: such as on a two lane road "do not pass-a vehicle is approaching" or "high speed vehicle is approaching to your left (or right);" "traffic light will turn in 10 seconds;" "turn left to find an open parking space;" "traffic is stopped 1.5 miles ahead;" "traffic has slowed to 20 mph 1.5 miles (or 2 blocks) ahead;" "recommended speed for turn ahead is 30 mph;" and/or "ice on bridge (or ramp) ahead."

As an example, a first mobile device may be traveling in a vehicle. The first mobile device may collect telematics data and/or other data, such as via a telematics application running on one or more processors mounted within the first mobile device. The first mobile device (and/or the telematics application) may detect a travel event from the data collected. For instance, the first mobile device (and/or the telematics application executing thereon) may determine that the vehicle is located on the highway, but the vehicle is moving slower than the posted speed limit. The first mobile device (and/or the telematics application) may then transmit the data collected and/or an associated message via wireless communication or data transmission to smart roadside infrastructure and/or nearby vehicles (or a second mobile device traveling within a nearby and second vehicle). The second mobile device (and/or a telematics application running thereon) may then, using the data received and/or message received from the first mobile device, generate an audible or visual warning or alert of the travel event, such as "Warning, congestion ahead," and/or "Recommend taking Exit 10 and traveling on Highway 12 for 5 miles until Exit 11 to avoid the congestion ahead." The second mobile device (and/or associated telematics application) may also be able to compare locations of the travel event with the current location of the second vehicle to determine if the travel event poses a potential obstacle to the second vehicle reaching its destination without interruption. Thus, the telematics data collected using a first mobile device (and/or a telematics application) and associated with a first driver may be used to alert a second driver (associated with the second mobile device) of a travel event and/or re-route the second vehicle to facilitate safer vehicle travel for the second driver and vehicle.

In one aspect, a mobile device (and/or the telematics application) may compare a vehicle's traveling speed with a known posted speed limit. If the vehicle's speed is below or above the posted speed by a certain threshold, for example, 10 or 20 miles-per-hour, then the mobile device may generate a warning and transmit the warning to roadside infrastructure and/or nearby mobile devices or vehicles. For example, the message may state "Slow moving vehicle in right hand lane ahead;" "High speed vehicle approaching from rear;" And/or "High speed vehicle approaching from ahead."

Other messages or alerts that may be generated from mobile devices (and/or telematics applications executing thereon), smart vehicle controllers, remote servers, and/or smart infrastructure and transmitted to a mobile device of a driver (and/or smart vehicle) may include "Construction 1 mile ahead;" "Rain (or Snow) 5 miles ahead;" "Detour 2 blocks ahead;" "Traffic light directly ahead will change from Green to Red starting in 5 seconds;" "Stranded vehicle on right side of road half a mile ahead;" "Recommend turning right at next intersection to avoid travel event 3 blocks ahead;" and/or other travel or traffic event-related messages.

An insurance provider may collect an insured's usage of the vehicle safety functionality provided herein, such as at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies (and/or premiums, rates, discounts, etc.) may be communicated to insurance customers for their review, modification, and/or approval—such as via wireless communication or data transmission from a remote server to a mobile device or the insured.

Telematics and Vehicle Navigation

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/ vehicle data in real-time as the vehicle is traveling. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The mobile device itself may be configured to identify the type of traffic event and transmit the type of traffic event to other mobile devices, a remote server, smart vehicles, and/or smart infrastructure. In one embodiment, the mobile device may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Additionally or alternatively, the mobile device may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108. Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification. Telematics collection system 100 may include various data communication channels for facilitating data communications between the various hardware and software components and/or communications with one or more external components.

Various references are made to "telematics data" throughout this disclosure. As discussed herein, the telematics data may include any suitable number and type of information that may be used to identify various anomalous conditions, events, hazards, weather conditions, etc. Examples of telematics data provided herein may include, but is not limited to, data including sensor metrics or other information generated, collected, measured, and/or transmitted from an originating device, which may indicate various physical properties, conditions, the environment, or other information associated with the originating device, which may be an originating mobile computing device located within an originating vehicle or the originating vehicle itself.

For example, the telematics data may indicate deceleration, GPS location, time, braking, data indicative of an originating vehicle turning, the speed of the originating vehicle (e.g., GPS-determined speed, onboard vehicle sensor based speed, etc.) GPS latitude and longitude, an originating vehicle heading, a battery level of an originating mobile computing device located in the originating vehicle, telephone usage information associated with the originating device, angular velocity metrics, current road lane information associated with the originating vehicle, etc.

To accomplish this, telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device, such as a mobile device (e.g., smartphone, tablet, laptop, wearable electronics, phablet, pager, personal digital assistant (PDA), smart glasses, smart watch or bracelet, etc.), while on-board computer may implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics to one or more external components.

In some aspects, the external components may include another mobile computing device substantially similar to or identical to mobile computing device 110. In accordance with such aspects, mobile computing device 110 may additionally or alternatively be configured to receive geographic location data and/or sensor metrics broadcasted from another mobile computing device, the details of which are further discussed below. Mobile computing device 110 may be configured to determine, upon receiving the geographic location data and/or sensor metrics, whether an anomalous condition exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data and/or telematics data by communicating with one or more vehicle sensors that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, and/or motion of vehicle 108 via any number of suitable sensors, such as speedometer sensors, braking sensors, airbag deployment sensors, crash detection sensors, etc.

In one aspect, mobile computing device 110 and/or on-board computer 114 may operate independently of one another to generate geographic location data and/or telematics data, to receive geographic location data and/or telematics data broadcasted from another telematics collection system, to determine whether to generate one or more alerts, and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data and/or telematics data, to receive geographic location data and/or telematics data broadcasted from another telematics collection system, to determine whether to generate one or more alerts, and to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
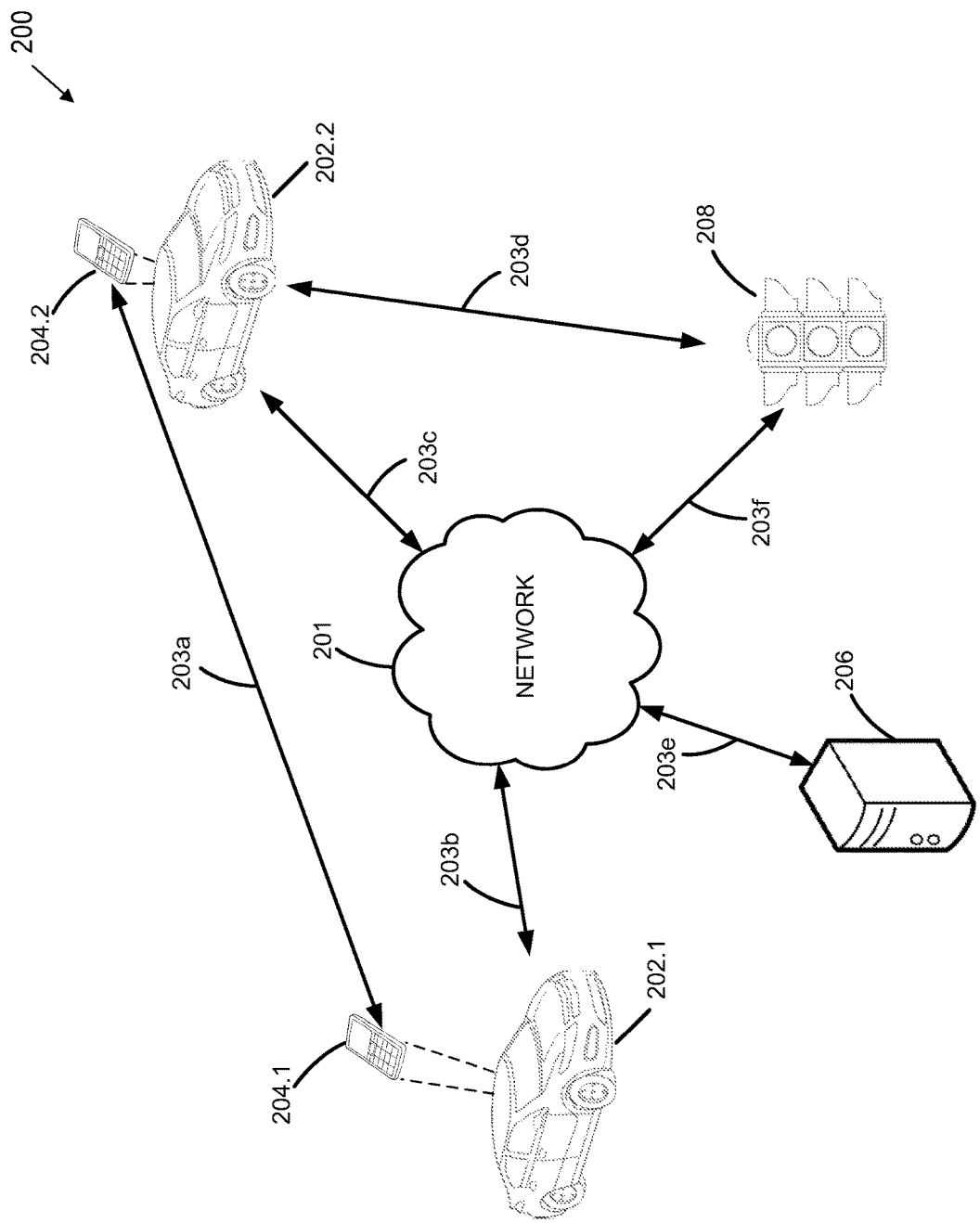
FIG. 2 illustrates a block diagram of an exemplary alert notification system 200 in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, and/or an infrastructure component 208. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Each of vehicles 202.1 and 202.2 may be configured for wireless inter-vehicle communication, such as vehicle-to-vehicle (V2V) wireless communication and/or data transmission.

Although alert notification system 200 is shown in FIG. 2 as including one network 201, two mobile computing devices 204.1 and 204.2, two vehicles 202.1 and 202.2, one external computing device 206, and/or one infrastructure component 208, various aspects include alert notification system 200 implementing any suitable number of networks 201, mobile computing devices 204, vehicles 202, external computing devices 206, and/or infrastructure components 208. For example, alert notification system 200 may include a plurality of external computing devices 206 and more than two mobile computing devices 204, any suitable number of which being interconnected directly to one another and/or via network 201.

In one aspect, each of mobile computing devices 204.1 and 204.2 may be configured to communicate with one another directly via peer-to-peer (P2P) wireless communication and/or data transfer. In other aspects, each of mobile computing devices 204.1 and 204.2 may be configured to communicate indirectly with one another and/or any suitable device via communications over network 201, such as external computing device 206 and/or infrastructure component 208, for example. In still other aspects, each of mobile computing devices 204.1 and 204.2 may be configured to communicate directly and indirectly with one and/or any suitable device, which may be concurrent communications or communications occurring at separate times.

Each of mobile computing devices 204.1 and 204.2 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.1, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d) and/or indirectly (e.g., via radio links 203c and 203f via network 201) using any suitable communication protocols.

Mobile computing devices 204.1 and 204.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Network 201 may be implemented as any suitable network configured to facilitate communications between mobile computing devices 204.1 and/or 204.2 and one or more of external computing device 206 and/or smart infrastructure component 208. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure public internet, a secure electronic communication network, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203f may represent wired links, wireless links, or any suitable combination thereof.

In aspects in which mobile computing devices 204.1 and 204.2 communicate directly with one another in a peer-to-peer fashion, network 201 may be bypassed and thus communications between mobile computing devices 204.1 and 204.2 and external computing device 206 may be unnecessary. For example, in some aspects, mobile computing device 204.1 may broadcast geographic location data and/or telematics data directly to mobile computing device 204.2. In this case, mobile computing device 204.2 may operate independently of network 201 to determine whether an alert should be generated at mobile computing device 204.2 based upon the geographic location data and the telematics data. In accordance with such aspects, network 201 and external computing device 206 may be omitted.

However, in other aspects, one or more of mobile computing devices 204.1 and/or 204.2 may work in conjunction with external computing device 206 to generate alerts. For example, in some aspects, mobile computing device 204.1 may broadcast geographic location data and/or telematics data, which is received by external computing device 206. In this case, external computing device 206 may be configured to determine whether an alert should be sent to mobile computing device 204.2 based upon the geographic location data and the telematics data.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1 and/or 204.2. For example, mobile computing device 204.1 and/or 204.2 may collect data (e.g., geographic location data and/or telematics data) as described herein, but may send the data to external computing device 206 for remote processing instead of processing the data locally. In such embodiments, external computing device 206 may receive and process the data to determine whether an anomalous condition exists and, if so, whether to send an alert notification to one or more mobile computing devices 204.1 and 204.2.

In one aspect, external computing device 206 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing device 206 may facilitate the receipt of telematics data or other data from one or more mobile computing devices 204.1-204.N, which may be associated with insurance customers and/or running a Telematics App, as further discussed below with reference to FIG. 3.

In aspects in which external computing device 206 facilitates communications with an insurer computing system (or is part of such a system), data received from one or more mobile computing devices 204.1-204.N may include logon credentials which may be verified by external computing device 206 or one or more other external computing devices, servers, etc. These logon credentials may be associated with an insurer profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 204.1-204.N may allow external computing device 206 to uniquely identify each insured customer and/or whether each identified insurance customer has installed the Telematics App. Furthermore, any data collected from one or more mobile computing devices 204.1-204.N may be referenced to each insurance customer and/or any insurance policies associated with each insurance customer for various insurance-related purposes.

For example, as further discussed below with reference to FIG. 3, the one or more mobile computing devices 204.1-204.N may broadcast, in addition to or as part of the telematics data, data indicative of whether a Telematics App has been installed and/or usage data indicative of how often a driver uses the Telematics App functionality while driving. Of course, similar or identical data may be received from a vehicle as opposed to the mobile computing device located in the vehicle. That is, the same functions discussed below with reference to FIG. 3 regarding the Telematics App installed and executed on a mobile computing device may also (or alternatively) be installed and executed as part of a vehicle's integrated computer functions, as previously discussed with reference to FIG. 1 above.

In various aspects, an insurer may leverage data regarding whether an insured customer has installed a Telematics App or how often the Telematics App is used while driving to calculate, adjust, and/or update various insurance pricing for an automotive insurance policy or other suitable insurance policy. For example, an insurer may adjust insurance premiums, rates, discounts, points, programs, etc., based upon the insured having the functionality discussed herein and/or the amount that the insured uses the functionality discussed herein.

In addition, external computing device 206 may facilitate the communication of the updated insurance policies, premiums, rates, discounts, etc., to insurance customers for their review, modification, and/or approval—such as via wireless communication or data transmission to one or more mobile computing devices 204.1-204.N. For example, an insurer may provide an initial discount for an insured customer installing the Telematics App and logging in with the Telematics App. To continue this example, because the alert notifications provided by the Telematics App may reduce the likelihood of a collision or other damage occurring to the vehicle or the driver, use of the Telematics App may function to mitigate or prevent driving risks upon which an insurance policy is partially based. Therefore, an insurer may provide an additional discount that increases with the insured customer's usage of the Telematics App while driving.

In some aspects, external computing device 206 may facilitate indirect communications between one or more of mobile computing devices 204.1-204.2, vehicles 202.1-202.N, and/or infrastructure component 208 via network 201 or another suitable communication network and/or wireless link. For example, external computing device 206 may receive telematics data from an originating mobile computing device 204.1 via radio link 203*b* and relay the telematics data to a destination mobile computing device 204.2 and/or to vehicle 202.2 via radio link 203*c*.

Infrastructure component 208 may be implemented as any suitable type of traffic infrastructure component configured to receive communications from and/or to send communications to other devices, such as external computing devices 204.1, 204.2 and/or external computing device 206, for example. For example, infrastructure component 208 may be implemented as a traffic light, a railroad crossing light, a construction notification sign, a roadside display configured to display messages, a billboard display, etc.

In some aspects, infrastructure component 208 may be implemented as one or more "smart" infrastructure components, which may be configured to communicate with one or more other devices directly and/or indirectly. For instance, smart infrastructure component 208 may be configured to communicate with one or more devices directly and/or indirectly. For example, smart infrastructure component 208 may be configured to communicate directly with mobile computing device 204.2 via link 203.*d* and/or with mobile computing device 204.1 via links 203*b* and 203*f* utilizing network 201. To provide another example, smart infrastructure component 208 may communicate with external computing device 206 via links 203e and 203f utilizing network 201.

Smart infrastructure component 208 may be implemented as any suitable type of traffic infrastructure component configured to receive communications from and/or to send communications to other devices, such as external computing devices 204.1, 204.2 and/or external computing device 206, for example. For example, smart infrastructure component 208 may be implemented as a traffic light, a railroad crossing light, a construction notification sign, a roadside display configured to display messages, a billboard display, etc.

In some aspects, smart infrastructure component 208 may be configured to receive geographic location data and/or telematics data from one or more other devices and to process this data to determine whether an anomalous condition has been detected and whether the detected anomalous condition satisfies a threshold distance condition with respect to smart infrastructure component 208. The threshold distance condition may include, for example, the geographic location of the anomalous condition being within a threshold radius of smart infrastructure component 208, on the same road serviced by smart infrastructure component 208, etc. If so, smart infrastructure component 208 may perform one or more relevant actions such as displaying one or more relevant messages to notify drivers in the vicinity, to modify traffic patterns, to change traffic light timing, to redirect traffic, etc.

In other aspects, smart infrastructure component 208 may receive data indicating that an alert is to be generated and/or the type of alert that is to be generated. In accordance with such aspects, one or more of mobile computing devices 204.1, 204.2 and/or external computing device 206 may make the determination of whether an anomalous condition exists and is within a threshold distance of smart infrastructure component 208. If so, the data received by smart infrastructure component 208 may be indicative of the type of anomalous condition, the location of the anomalous condition, commands to cause smart infrastructure component 208 to perform one or more acts, the type of acts to perform, etc.

To provide some illustrative examples, if smart infrastructure component 208 is implemented as a smart traffic light, smart infrastructure component 208 may change a traffic light from green to red (or vice-versa) or adjust a timing cycle to favor traffic in one direction over another. To provide another example, if smart infrastructure component 208 is implemented as a traffic sign display, smart infrastructure component 208 may display a warning message that the anomalous condition (e.g., a traffic accident) has been detected ahead and/or on a specific road corresponding to the geographic location data.

Exemplary End-User/Destination Devices

The following details regarding the determination of an anomalous condition are explained in this section with reference to computing device 300. In the present aspect, computing device 300 may be implemented as any suitable computing device, such as a mobile computing device (e.g., mobile computing device 100, as shown in FIG. 1). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., remote computing device 206 or smart infrastructure component 208, as shown in FIG. 2).

Depending upon the implementation of computing device 300, the methods and processes utilized to determine the existence of anomalous conditions may be performed locally, remotely, or any suitable combination of local and remote processing techniques.

Figure 3:
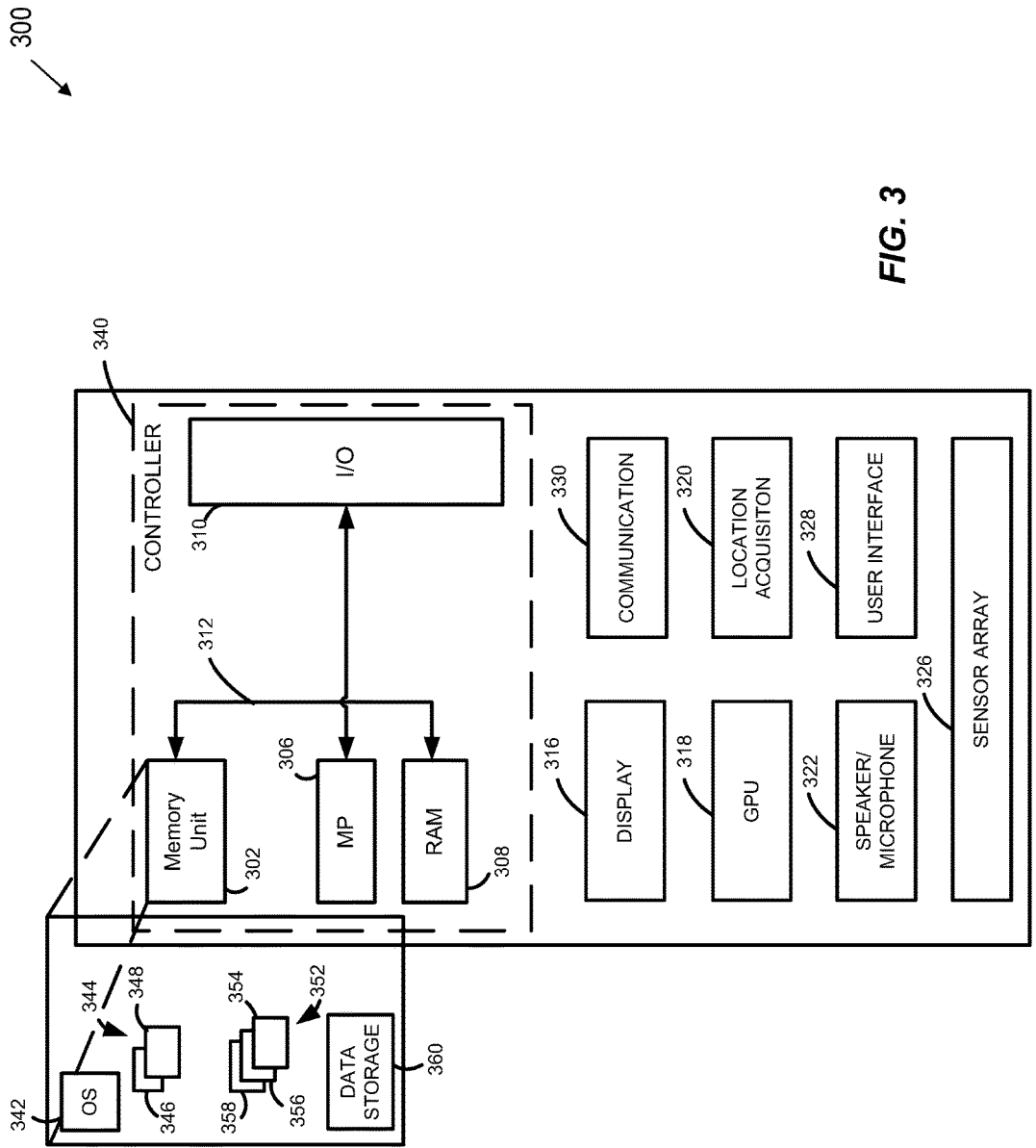
FIG. 3 illustrates a block diagram of an exemplary computing device 300 in accordance with an exemplary aspect of the present disclosure.

FIG. 3 illustrates a block diagram of an exemplary computing device 300 in accordance with an exemplary aspect of the present disclosure. Computing device 300 may be implemented as any suitable computing device configured to (1) monitor, measure, generate, and/or or collect telematics data; (2) broadcast the geographic location data and/or the telematics data to one or more external components, such as via wireless communication and/or data transmission; (3) receive geographic location data and/or telematics data broadcasted from another device, such as via wireless communication and/or data transmission; (4) determine whether an anomalous condition exists at the geographic location indicated by the geographic location data based upon the telematics data; (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 240 may be configured to communicate with additional data storage mechanisms that are not shown in FIG. 3 for purposes of brevity (e.g., one or more hard disk drives, optical storage drives, solid state storage devices, etc.) that reside within or are otherwise associated with mobile computing device 200.

Program memory 302 may store data used in conjunction with one or more functions performed by computing device 300 to facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between mobile computing device 204.1 and (i) one or more networks (e.g., network 201), (ii) other mobile computing devices (e.g., mobile computing device 204.2), (iii) external computing devices (e.g., external computing device 206), (iv) vehicles (e.g., vehicle 108), (v) vehicle on-board computers (e.g., on-board computer 114), infrastructure components (e.g., smart infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data and/or telematics data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other mobile computing devices, networks, external computing devices, smart infrastructure components, etc. As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle in which it is carried (e.g., vehicle 108) via BLUETOOTH communications.

Communication unit 330 may be configured to broadcast data and/or to receive data in accordance with any suitable communications schedule. For example, communication unit 330 may be configured to broadcast geographic location data and/or telematics data every 15 seconds, every 30 seconds, every minute, etc. As will be further discussed below, the geographic location data and/or telematics data may be sampled in accordance with any suitable sampling period. Thus, when broadcasted by communications unit 330 in accordance with a recurring schedule, the geographic location data and/or telematics data may include a log or collection of the geographic location data and/or telematics data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data has been sampled since the last transmission, which will be further discussed below with regards to sensor array 326. Controller 340 may determine whether has been sampled since the last transmission by, for example, analyzing a memory address range (e.g., in data storage 360, RAM 308, etc.) associated with the storage of the telematics data and comparing the contents of this buffer to a known range of valid values.

To provide another example, aspects include communication unit 330 being additionally or alternatively configured to only broadcast telematics data when computing device 300 is connected to a power source (e.g., an in-vehicle charger). To provide still another example, aspects include communication unit 330 being additionally or alternatively configured to only broadcast telematics data when communication unit 330 is connected to and/or communicating with a device identified as a vehicle. This may include, for example, identifying a BLUETOOTH connection as a valid vehicle to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft"

keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, and/or direction associated with movements of computing device 300 and, thus, a vehicle in which computing device 300 is positioned. Additionally or alternatively, sensor array 326 may be configured to communicate with one or more portions of computing device 300 to measure, collect, and/or generate one or more sensor metrics from one or more non-sensor sources, which will be further discussed below.

To generate one or more sensor metrics, sensor array 326 may include, for example, one or more cameras, accelerometers, gyroscopes, magnetometers, barometers, thermometers, proximity sensors, light sensors, Hall Effect sensors, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In an aspect, sensor array 326 may include one or more cameras or other image capture devices. In accordance with such aspects, the one or more cameras that are part of sensor array 326 may be mounted or otherwise positioned on mobile computing device 300 such that, when mobile computing device 300 is docked, cradled, or otherwise mounted within a vehicle, images may be captured from this vantage point. For example, when mobile computing device 300 is mounted within a vehicle, a camera implemented by sensor array 326 may function as a dashboard camera, capturing images and/or video data of various objects outside of the vehicle from this vantage point. Additionally or alternatively, mobile computing device 300 may capture audio data with the image and/or video data via speaker/microphone 322.

In various aspects, mobile computing device 300 may begin to capture data upon detecting that it has been placed in a cradle, and otherwise not capture data in such a manner. This detection may occur, for example, via one or more conditions being satisfied. For example, mobile computing device 300 may utilize one or more sensors (e.g., an accelerometer that is part of sensor array 326) to determine that mobile computing device 300 has changed orientation to horizontal (as is common when docked in a vehicle), that mobile computing device 300 is communicating via BLUETOOTH with the vehicle, that the vehicle is moving above a threshold speed, etc. Aspects include any suitable number of conditions, upon being satisfied, triggering mobile computing device 300 to start collecting telematics data, images, audio, video, etc., via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a motion, speed, direction, and/or g-force associated with vehicle braking, acceleration, and cornering at a rate of 15 Hz, 30 Hz, 60 Hz, etc., which may be the same sampling rate at which other sensor metrics are sampled or different sampling rates. Additional examples of sensor metrics may be those applicable to the determination of a compass heading, whether a vehicle is turning, a current lane the vehicle is in, etc.

In one aspect, sensor array 326 may include one or more cameras or other image capture devices. In accordance with such aspects, the one or more cameras that are part of sensor array 326 may be mounted or otherwise positioned on mobile computing device 300 such that, when mobile computing device 300 is docked, cradled, or otherwise mounted within a vehicle, images may be captured from this vantage point. For example, when mobile computing device 300 is mounted within a vehicle, a camera implemented by sensor array 326 may function as a dashboard camera, capturing images and/or video data of various objects outside of the vehicle from this vantage point. Additionally or alternatively, mobile computing device 300 may capture audio data with the image and/or video data via speaker/microphone 322.

In various aspects, mobile computing device 300 may begin to capture data upon detecting that it has been placed in a cradle, and otherwise not capture data in such a manner. This detection may occur, for example, via one or more conditions being satisfied. For example, mobile computing device 300 may utilize one or more sensors (e.g., an accelerometer that is part of sensor array 326) to determine that mobile computing device 300 has changed orientation to horizontal (as is common when docked in a vehicle), that mobile computing device 300 is communicating via BLUETOOTH with the vehicle, that the vehicle is moving above a threshold speed, etc. Aspects include any suitable number of conditions, upon being satisfied, triggering mobile computing device 300 to start collecting telematics data, images, audio, video, etc., via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a motion, speed, direction, and/or g-force associated with vehicle braking, acceleration, and cornering at a rate of 15 Hz, 30 Hz, 60 Hz, etc., which may be the same sampling rate at which other sensor metrics are sampled or different sampling rates. Additional examples of sensor metrics may be those applicable to the determination of a compass heading, whether a vehicle is turning, a current lane the vehicle is in, etc. To provide another example, sensor array 326 may be configured to implement one or more gyroscopes to improve the accuracy of the measured one or more sensor metrics and to determine whether the phone is in use or stationary within a vehicle. To provide another example, sensor array 326 may implement a compass (magnetometer) to determine a direction or heading of a vehicle in which computing device 300 is located.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In various aspects, sensor array 326 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or a smaller resolution).

Additionally or alternatively, sensor array 326, location acquisition unit 320, and/or communication unit 330 may log or otherwise measure various metrics or other data that may be used by controller 340 to determine how often the functionality of the Telematics Application is being utilized when a vehicle is being driven. For example, sensor array 326 may log the time when telematics data is being collected, when the Telematics Application is running, and/or when the Telematics Application has been started. To provide additional examples, communication unit 330 may store data indicative of a BLUETOOTH connection status of mobile computing device 300. To provide yet another example, location acquisition unit 320 may store and/or log the changes in geographic location of mobile computing device 300 over time.

In various aspects, controller 340 may determine how often a driver uses the Telematics App based upon any suitable combination of the aforementioned data. For example, the BLUETOOTH connection status may be leveraged to determine whether mobile computing device 300 is located in a vehicle. To provide another example, the changes in the geographic location data over time may be utilized to determine whether mobile computing device 300 has exceeded a threshold speed for a threshold duration of time. In this way, a determination may be made whether mobile computing device 300 is located in a vehicle while the vehicle is being driven.

Various aspects include the aforementioned data being leveraged to calculate a usage amount in which a user utilizes the Telematics App while driving. For example, the usage amount may be based upon a total proportion of time (e.g., 80% of the time while driving, the functionality provided by the Telematics App is enabled). To provide another example, the usage amount may be mileage-based (e.g., 90% of the miles driven are done so with the functionality of the Telematics App available to the driver). As discussed above, this usage data may be sent to an insurer or other third party via a telematics data transmission or a separate transmission (e.g., one that is received at external computing device 206) and used to set and/or adjust an insurance policy, premium, or discount for the insured customer. Furthermore, the usage data may be utilized by an external computing device to generate a usage-based discount that is tied to an amount that the capability of receiving and analyzing the telematics data, or generating appropriate alerts or recommendations, is used.

In one aspect, sensor array 326 may sample one or more sensor metrics based upon one or more conditions being satisfied. For example, sensor array 326 may determine, based upon gyroscope sensor metrics, communication with controller 340, etc., whether computing device 300 is in use.

If computing device 300 is in use (e.g., when implemented as a mobile computing device) then the movement of computing device 300 within the vehicle may not truly represent the vehicle motion, thereby causing sensor metrics sampled during this time to be erroneous. Therefore, aspects include sensor array 326 sampling the one or more sensor metrics when computing device 300 is not in use, and otherwise not sampling the one or more sensor metrics.

In one aspect, sensory array 326 may include one or more cameras and/or image capture devices. When sensory array 326 is implemented with one or more cameras, these cameras may be configured as any suitable type of camera configured to capture and/or store images and/or video. For example, when mobile computing device 300 is mounted in a vehicle, the camera may be configured to store images and/or video data of the road in front of the vehicle in which it is mounted, and to store this data to any suitable portion of program memory 302 (e.g., data storage 360). Controller 340 and/or MP 306 may analyze this data to generate one or more local alerts, to transmit signals indicative of detected alters to one or more other devices, etc., which is further discussed below with reference to the execution of anomalous condition detection routine 358.

Again, the telematics data broadcasted by computing device 300 may include one or more sensor metrics. However, the telematics data may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes store, the Google Play Store, the Windows Phone Store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

In an aspect, alert notification application 346 may function as a Telematics Application (or "App") which is downloaded and installed on mobile computing device 300 by a user via a suitable third-party software store and/or portal (e.g., Apple iTunes, Google Play, the Windows Store, etc.).

To provide an illustrative example, alert notification application 344 may include instructions for performing tasks such as determining a geographic location of computing device 300 (e.g., via communications with location acquisition unit 330), monitoring, measuring, generating, and/or collecting telematics data, broadcasting the geographic location data and/or the telematics data to one or more external devices, receiving geographic location data and/or telematics data from another computing device, determining whether an anomalous condition exists based upon the geographic location data and/or the telematics data, generating one or more alerts indicative of the determined anomalous condition, receiving user input, facilitating communications between computing device 300 and one or more other devices in conjunction with communication unit 330, etc.

To provide another example, aspects include mobile computing device 300 being configured to capture image and/or video data while cradled in a dock or otherwise mounted within a vehicle, as previously discussed. In accordance with various aspects, this data capture may be facilitated, for example, by instructions stored in alert notification application 346 being executed by controller 340 and/or MP 306. In various aspects, alert notification application 346 may facilitate mobile computing device 300 capturing image, audio, and/or video data at any suitable sampling rate (e.g., once every second, 5 times per second, etc.) and storing this data to any suitable portion of the mobile computing device (e.g., data storage 360). Aspects include data sampling processes occurring as background operations to allow other applications to be run on mobile computing device 300 (e.g., navigation applications) while telematics data and/or images, video, and/or audio data is collected by mobile computing device 300.

Software applications 344 may include a web browser 348. In some embodiments (e.g., when computing device 300 is implemented as a mobile computing device), web browser 348 may be a native we browser application, such as Apple's Safari®, Google Android™ mobile web browser, Microsoft Internet Explorer® for Mobile, Opera Mobile™, etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 204.2, as shown in FIG. 2). This web page information may be utilized in conjunction with alert notification application 346 to perform one or more function of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data. In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330).

In one aspect, telematics collection routine 354 may work in conjunction with controller 340 and/or alert notification application 346 to periodically listen for and/or to periodically broadcast telematics data. For example, controller 340 may, upon executing alert notification application 346, periodically listen for a broadcast containing telematics data generated and transmitted from other mobile computing devices, vehicles, external computing devices, and/or infrastructure components. Upon detecting a broadcast, controller 340 may download the broadcast to a suitable portion of memory unit 302 and analyze the telematics data contained therein for potential traffic events, travel events, alerts, messages, etc. Such aspects may be particularly useful, for example, to save battery life of the mobile computing device, as continuous listening is not necessary but instead may be performed, for example, in accordance with a particular timing schedule.

To provide another example, controller 340 may, upon executing alert notification application 346, periodically broadcast telematics data, which may be received by other mobile computing devices, vehicles, external computing devices, and/or infrastructure components.

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates). In some aspects, geographic location determination routine 356 may facilitate generating and/or storing geographic location data locally via one or more components of computing device 300 (e.g., via location acquisition unit 320 and/or communication unit 330). In other aspects, geographic location determination routine 356 may facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists based upon the telematics data, the geographic location data, and/or image and/or video data captured by one or more cameras or other imaging devices. An anomalous condition may include any suitable condition that indicates a deviation from normal traffic patterns. For example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. Furthermore, because each vehicle may sample and/or broadcast geographic location data and/or telematics data in real time, the anomalous conditions may be detected with minimal delay as they occur.

Although the speed of the vehicle may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide an illustrative example based upon a traffic accident, if a first vehicle carrying a first computing device 300 is slowed down due to a traffic accident, then the one or more sensor metrics sampled by sensor array 326 will indicate the speed of the first vehicle over a period of time. If the one or more sensor metrics indicate that the first vehicle's speed is below the speed limit by some threshold amount or proportion thereof (e.g., 20 mph in a 55 mph zone, 50% of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected. This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, and/or the geographic location data associated with the detected anomalous condition. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data and/or geographic location data but not notification data. In accordance with such aspects, upon being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices, the second computing device 300 may ignore the telematics data, thereby saving processing power and battery life. However, if the second computing device 300 determines that the geographic location data indicates a potentially relevant anomalous condition, the second computing device 300 may further process the telematics data and take the appropriate relevant action if an anomalous condition is found (e.g., issue an alert notification, generate an alert, display a warning message, etc.).

To provide yet another example by further modifying the details in the previous two, aspects may include computing device 300 broadcasting the telematics data and geographic location data to an external computing device (e.g., to external computing device 206 via network 201, as shown in FIG. 2). In addition, the second computing device 300 associated with the second vehicle may likewise broadcast telematics data and geographic location data to the external computing device. In accordance with such aspects, the external computing device may determine whether an anomalous condition exists and is relevant to each of the first and second devices 300 based upon a geographic relationship between the first and second devices 300. When relevant, external computing device may be configured to send alert notifications to the first and/or second devices 300, which may include any suitable type of communications such as push notifications, a short messaging service (SMS) message, an email, a notification that used in conjunction with the OS running on each receptive computing device 300, etc. Upon receiving the notification from the external computing device, the first and/or second computing device 300 may generate an alert indicating a description of the anomalous condition and/or its location.

The geographic relationship between two or more devices 300 may be utilized in several ways to determine the relevance of the anomalous condition. For instance, current speed, location, route, destination, and/or direction of travel of a first vehicle (collecting and/or associated with the telematics data) may be individually or collectively compared with current speed, location, route, destination, and/or direction of travel of a second vehicle traveling on the road. As one example of the geographic relationship, a first vehicle location (and associated with a travel or traffic event) may be compared with a second vehicle location, current route, and/or destination to determine whether the second vehicle should divert course or slow down to alleviate the risk of the second vehicle being involved in a collision or a traffic jam (as a result of the travel or traffic event that is identified by the telematics data).

As another example of the geographic relationship, a radius from one vehicle or a line-of-sight distance between vehicles may be utilized and compared to a threshold distance. For example, if computing device 300 is implemented as an external computing device and determines a line-of-sight distance between a first and second vehicle to be less than a threshold distance (e.g., a half mile, one mile, etc.), then the external computing device may issue an alert notification to both vehicles. In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, etc.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

To provide another illustrative example, as previously discussed, one or more cameras integrated as part of sensor array 326 may store image and/or video data from a vantage point within a vehicle in which mobile computing device 300 is mounted to act as a dashboard camera. In accordance with such aspects, anomalous condition detection routine 358 may include instructions, that when executed by controller 340, facilitate the analysis of the image and/or video data to detect one or more anomalous conditions that may pose an immediate threat to the driver. These anomalous objects may also be identified as a traffic event, as previously discussed. This analysis may be performed in accordance with any suitable object recognition and/or image analysis to detect images in the path of the vehicle, such as animals, pedestrians, other vehicles, potholes, etc.

Upon detecting an anomalous object, mobile computing device 300 may issue the appropriate alert via display 316 and/or sound an alarm via speaker/microphone 322. Additionally or alternatively, mobile computing device 300 may, upon detecting an anomaly, broadcast one or more signals via communication unit 330, which are received directly or indirectly by other mobile computing devices. Again, these other mobile computing devices may then generate alert notifications locally when close to the geographic location of mobile computing device 300 where the signal was broadcasted. Aspects in which the detected anomalous condition is shared in this manner may be particularly useful when the identified anomaly is likely to threaten other drivers using the same road, such as potholes or objects blocking the roadway, for example.

Although FIG. 3 depicts controller 340 as including one program memory 302, one MP 306, and one RAM 308, controller 340 may include any suitable number of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Exemplary Screenshots of an Alert Notification Application

Figures 4A, 4B:
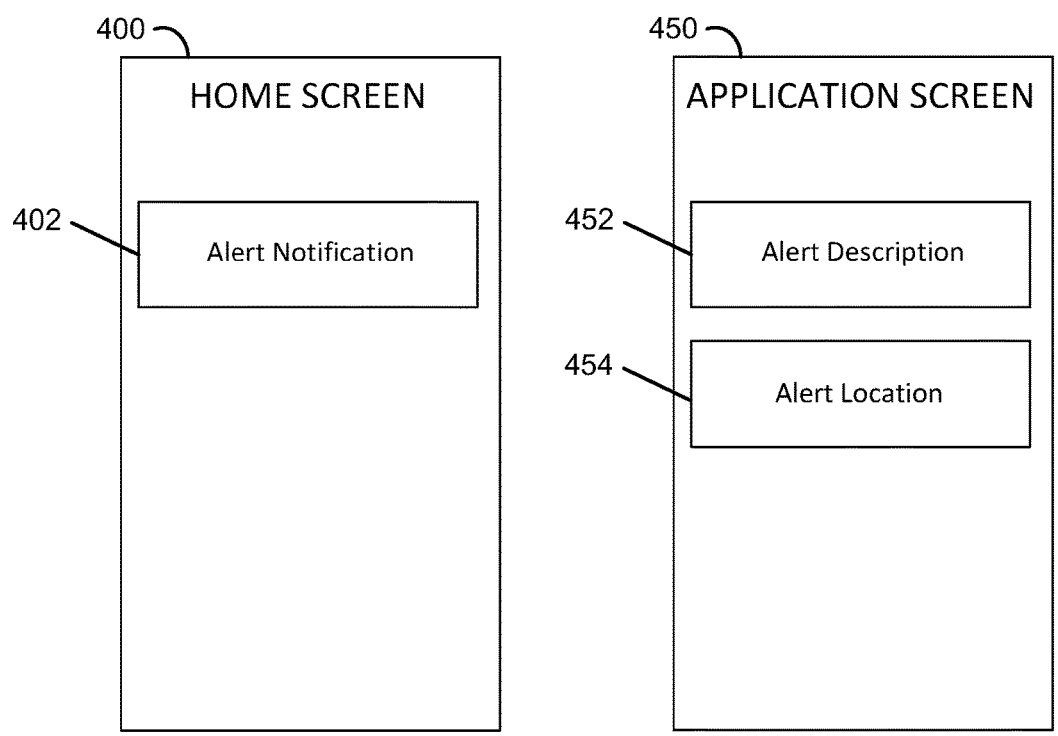
FIG. 4A illustrates an exemplary mobile computing device home screen 400 in accordance with an exemplary aspect of the present disclosure.
FIG. 4B illustrates an exemplary mobile computing device application screen 450 in accordance with an exemplary aspect of the present disclosure.

FIG. 4A illustrates an example mobile computing device home screen 400 in accordance with an exemplary aspect of the present disclosure. In various aspects, home screen 400 is displayed on a mobile computing device, such as mobile computing device 110 or mobile computing devices 204.1-204.2, as shown in FIGS. 1 and 2, respectively. In accordance with such aspects, home screen 400 may be displayed as part of a device display, such as display 316, for example, as shown in FIG. 3.

Home screen 400 may be displayed as a default screen on a mobile computing device. In one embodiment, home screen 400 may facilitate a lock screen of a mobile computing device. Lock screens may be typically displayed when a user locks the mobile computing device to enter a lock screen mode (e.g., by pressing a physical button). Additionally or alternatively, the mobile computing device may revert to the lock screen when inactive for a threshold period of time. The lock screen prevents a user from using a portion of the mobile computing device functionality. For example, a lock screen might prevent a mobile computing device in a user's pocket from accidentally sending SMS messages or phone calls.

Although lock screens typically limit the functionality of the device when enabled, it may be desirable for certain applications to provide a user with some functionality via the lock screen. For example, if the mobile computing device is used to play music, a lock screen overlay could allow a user to change tracks, pause a track, or adjust the volume level without unlocking the phone. In accordance with some aspects, alert notification 402 may be displayed as part of a home screen and/or lock screen of a mobile computing device, as shown in FIG. 4A.

Although alert notification 402 may be displayed as part of home screen 400, other aspects include alert notification 402 being displayed as part of a notification system separate from home screen 400. For example, some mobile phone operating systems (e.g., the Android OS) implement a universal "pull-down" notification system where all incoming notifications are displayed. In these notification systems, new notifications are initially previewed in a notification bar at the top of the phone display, and a user may pull down the notification bar (e.g., by using a swiping gesture) to access the details of any received notifications. In one aspect, alert notification 402 may be displayed as part of a notification bar type notification.

As previously discussed with reference to FIG. 3, a device running the alert notification application may be configured to determine whether an anomalous condition has been detected and/or to receive alert notifications sent by other devices that have done so. In accordance with such aspects, alert notification 402 is a block diagram representation of what may be generated upon detection of an anomalous condition and/or receiving an indication that an anomalous condition has been detected. Alert notification 402 may be implemented as any suitable graphic, label, text, description, etc., to convey this to a user. In one embodiment, alert notification 402 may be interactive and may facilitate a user selection via an appropriate gesture (e.g., swiping, tapping, etc.).

FIG. 4B illustrates an example mobile computing device application screen 450 in accordance with an exemplary aspect of the present disclosure. In various aspects, application screen 450 may be displayed on a mobile computing device, such as mobile computing device 110 or mobile computing devices 204.1-204.2, as shown in FIGS. 1 and 2, respectively. In accordance with such aspects, application screen 450 may be displayed as part of a device display, such as display 316, for example, as shown in FIG. 3.

In one aspect, application screen 450 may be displayed upon a user selecting alert notification 402 from home screen 400. Application screen 450 may include an alert description 452 and an alert location 454. Alert description 452 is a block diagram representation of one or more descriptions of the alerts related to the detected anomalous condition. Alert description 452 may be implemented as any suitable graphic, label, text, description, etc., to convey this to a user. For example, alert description 452 may include a text description such as "slow traffic ahead," "traffic at standstill ahead," "unpaved road ahead," "potential icy conditions ahead," "pulled over vehicle ahead," etc.

Alert location 454 is a block diagram representation of one or more descriptions of the location of the anomalous condition. Alert location 454 may be implemented as any suitable graphic, label, text, description, etc., to convey this to a user. For example, alert location 454 may include a directional compass indicating a direction towards the anomalous condition from the mobile computing device displaying application screen 450. To provide additional examples, alert location 454 may include a distance to the anomalous condition, a map overlaid with the location of the mobile computing device displaying application screen 450 to indicate the position of the mobile computing device in relation to the anomalous condition, the threshold distances and/or geofences used to determine the relevance of the anomalous condition, etc.

Exemplary Method of Generating Alert Notifications

Figure 5:
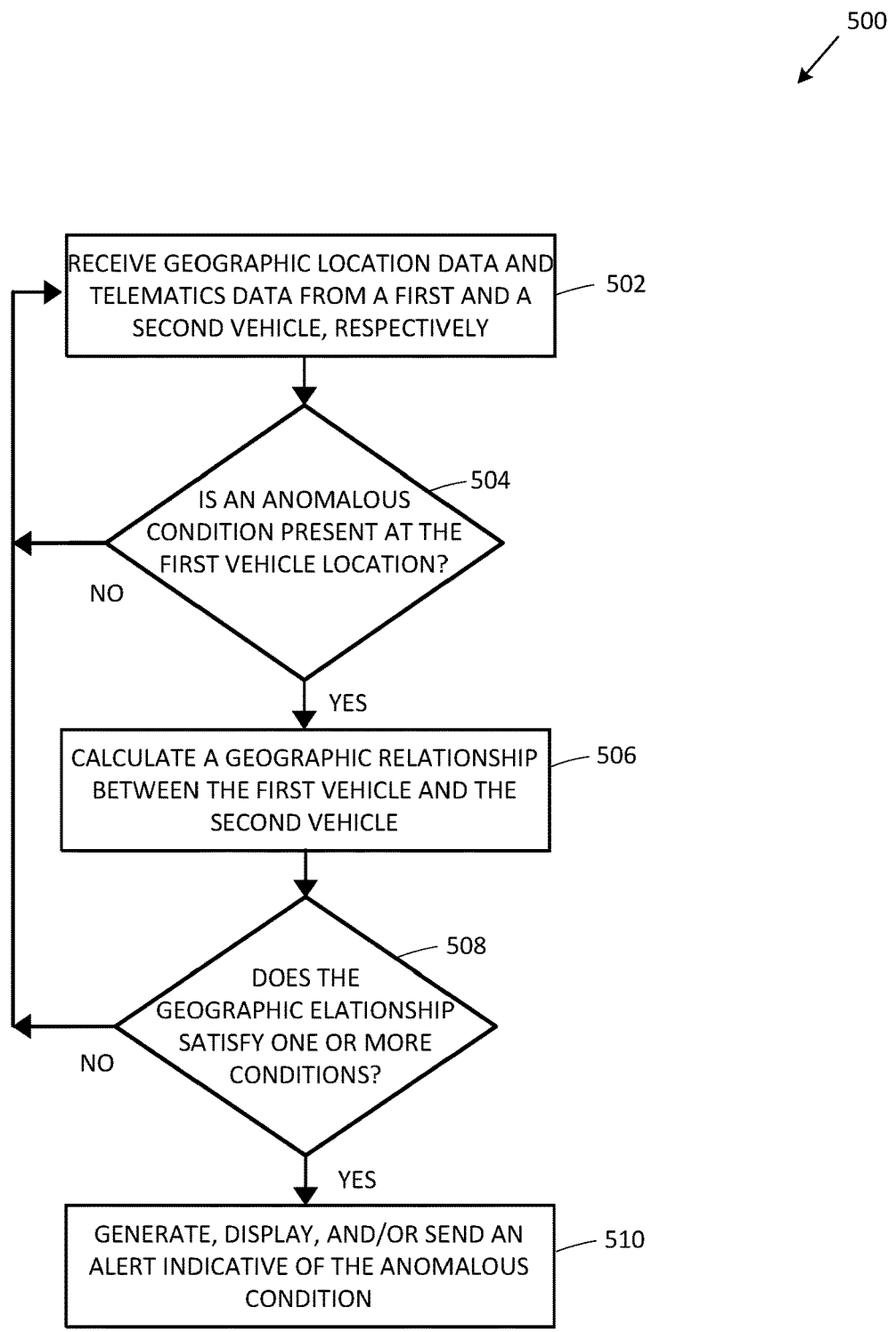
FIG. 5 illustrates an exemplary method 500 of generating, displaying, and/or sending an alert based upon telematics data in accordance with an exemplary aspect of the present disclosure.

FIG. 5 illustrates an exemplary method 500 of generating, displaying, and/or sending an alert based upon telematics data in accordance with an exemplary aspect of the present disclosure. In the present aspect, the method 500 may be implemented by any suitable computing device (e.g., mobile computing devices 204.1 and 204.2, external computing device 206, and smart infrastructure component 208, as shown in FIG. 2). In one aspect, the method 500 may be performed by one or more processors, applications, and/or routines, such as any suitable portion of controller 340, software applications 344, and/or software routines 352, for example, as shown in FIG. 3.

The method 500 may start when one or more processors receive geographic location data and/or telematics data from a first and a second respective vehicle (block 502). The geographic location data may include, for example, latitude and longitude coordinates obtained by a mobile computing device and/or an on-board computer located within each vehicle. The telematics data may include, for example, one or more sensor metrics indicative of a motion of each vehicle, timestamp data, road type data, population density data, and any other suitable data indicative of a status of the device from which it is received, as previously discussed with reference to FIG. 3 (block 502). The geographic location data and/or telematics data may be generated, for example, by one or more mobile computing devices and/or on-board computers located within, or otherwise associated with, the first and second vehicles.

The method 500 may include one or more processors determining whether an anomalous condition is present at the location of the first or the second vehicle based upon the telematics data received from each respective vehicle (block 504). The determination may be made, for example, when one or more sensor metrics, included in the telematics data, indicates that a vehicle is moving at a slower rate of speed, that an airbag has been deployed, that a crash has occurred, etc. (block 504). If the one or more processors determine that an anomalous condition is present, then method 500 may continue (block 506). Otherwise, the method 500 may revert to receiving geographic location data and/or telematics data (block 502).

The method 500 may include one or more processors calculating a geographic relationship between the first and the second vehicle (block 506). This geographic relationship may be a geofence around the first or the second vehicle, a radius around the first or the second vehicle representing a threshold distance, etc. (block 506).

The method 500 may include one or more processors determining whether the geographic relationship satisfies one or more conditions (block 508). These conditions may include, for example, one of the vehicles being within the radius, the threshold distance, and/or the geofence (block 508) that was calculated as a geographic relationship between the first and the second vehicles (block 506). Other conditions may include, for example, determining whether a location of traffic event (as determined from the telematics data associated with one vehicle) may be in the vicinity or pre-determined threshold distance of the current location, route, and/or destination another vehicle traveling on the road. Other geographical relationships may be determined, including those discussed elsewhere herein.

If the one or more conditions are satisfied, then the method 500 may continue (block 510). Otherwise, the method 500 reverts to receiving geographic location data and/or telematics data (block 502).

The method 500 may include one or more processors generating, displaying, and/or sending an alert indicative of the anomalous condition (block 510). In various aspects, the method 500 may include different acts that may be performed based upon the type of computing device. For example, if method 500 is performed by a mobile computing device, the method 500 may include generating and displaying the alert, as previously discussed with reference to FIGS. 4A and 4B (block 510). However, if the method 500 is performed by a smart infrastructure component, the method 500 may include displaying a message, as previously discussed with reference to FIG. 2 (block 510). To provide yet another example, if the method 500 is performed by an external computing device, then the method 500 may include one or more processors sending an alert notification to another device, as previously discussed with reference to FIG. 2 (block 510).

The method 500 may include additional, fewer, or alternate actions, including those discussed elsewhere herein. For instance, in addition to generating alerts, the method may include generating, sending, receiving, and/or displaying alternate routes to destinations that avoid the traffic event or anomalous condition.

Exemplary Method of Sending Alert Notifications

In one aspect, a computer-implemented method for sending alerts indicative of anomalous conditions may be provided. A method may include: (1) receiving, by one or more processors, first and second geographic location data indicative of a geographic location of a first and a second vehicle, respectively; (2) receiving, by one or more processors, first and second telematics data indicative of a motion of the first and the second vehicle, respectively; (3) determining, by one or more processors, whether an anomalous condition (such as vehicle accident, traffic event, traffic jam, congestion, construction, other travel event, etc.) is present at the geographic location of the first vehicle based upon the first telematics data; (4) calculating, by one or more processors, a geographic relationship between the first vehicle and the second vehicle based upon the first and the second geographic location data; and/or (5) sending, by one or more processors, an alert indicative of the anomalous condition (and/or alternate route avoiding the anomalous condition) to the second vehicle when (i) the one or more processors determine that the anomalous condition is present at the geographic location of the first vehicle, and/or (ii) the geographic relationship between the first and second vehicles satisfies a threshold distance condition such that the risk of an accident or collision involving the second vehicle due to the anomalous condition is alleviated.

Additionally or alternatively, (1) the first and second geographic location data may be received via a first and a second mobile computing device travelling within the first and the second vehicle, respectively; and/or (2) the first and second telematics data may be received via the first and the second mobile computing device, respectively.

In various aspects, the telematics data may include (1) a timestamp; (2) one or more sensor metrics indicative of braking motion of the first vehicle; (3) one or more sensor metrics indicative of acceleration motion of the first vehicle; (4) one or more sensor metrics indicative of cornering motion of the first vehicle; (5) one or more sensor metrics indicative of a direction of the first vehicle; (6) one or more sensor metrics indicative of a usage of the first mobile computing device; (7) a battery level associated with the first mobile computing device; and/or (8) a usage indicator associated with the first mobile computing device.

Furthermore, the determination of whether the anomalous condition is present at the geographic location of the first vehicle may include determining whether a speed of the first vehicle is less than a threshold speed. Additionally or alternatively, the method may include calculating, by one or more processors, a geofenced area around the first vehicle, and the threshold distance condition may be satisfied when the second vehicle is located within the geofenced area and/or when the second vehicle is within a threshold distance of the first vehicle.

The method may also include determining, by one or more processors, a population density corresponding to the geographic location of the first vehicle based upon the first telematics data, and/or adjusting, by one or more processors, the geofenced area based upon the population density.

The method may include generating an alternate route for a vehicle that avoids the anomalous condition by comparing the location (e.g., GPS location) of the anomalous condition with the current GPS or other location, current route, and/or current destination of the vehicle. The method may include displaying the alternate route to a driver of the vehicle, such as on a navigation unit of the vehicle and/or navigation or map-based application of a mobile device associated with the driver. The method may include additional, less, or alternate actions, including those discussed elsewhere herein.

Exemplary Mobile Computing Device

In yet another aspect, a first mobile computing device is described that may be located within a first vehicle and include (1) a communication unit configured to receive (i) telematics data from a second mobile computing device indicative of a motion of a second vehicle in which the second mobile computing device is located, and/or (ii) geographic location data indicative of a location of the second vehicle; and/or (2) a processor configured to: (i) determine whether an anomalous traffic condition is present at the geographic location of the second vehicle based upon the geographic location data; (ii) determine a geographic location of the first mobile computing device; (iii) calculate a geographic relationship between the first vehicle and the second vehicle based upon the geographic location data and the geographic location of the first mobile computing device; and/or (iv) generate an alert indicative of the anomalous traffic condition when the processor determines that the anomalous condition is present at the geographic location of the second vehicle, and/or the geographic relationship between the first and second vehicles satisfies a threshold distance condition to facilitate safer driving, warning drivers of the anomalous condition, and/or reducing a risk of vehicle collisions. The mobile computing device may include additional, less, or alternate functionality, including that discussed elsewhere herein.

For instance, the telematics data and/or the geographic location data may be received in accordance with (1) peer-to-peer communications between the first mobile computing device and the second mobile computing device; and/or (2) network communications between the first mobile computing device and the second mobile computing device via an external computing device. Furthermore, in various aspects, the telematics data may include (1) a timestamp; (2) one or more sensor metrics indicative of braking motion of the first vehicle; (3) one or more sensor metrics indicative of acceleration motion of the first vehicle; (4) one or more sensor metrics indicative of cornering motion of the first vehicle; (5) one or more sensor metrics indicative of a direction of the first vehicle; (6) one or more sensor metrics indicative of a usage of the first mobile computing device; (7) a battery level associated with the first mobile computing device; and/or (8) a usage indicator associated with the first mobile computing device.

Additionally or alternatively, the processor of the first mobile computing device may be configured to determine whether the anomalous traffic condition is present at the geographic location of the first vehicle based upon whether a speed of the first vehicle is less than a threshold speed. Still further, the processor of the first mobile computing device may be further configured to calculate a geofenced area around the second vehicle, and the threshold distance condition may be satisfied when the second vehicle is located within the geofenced area. The threshold distance condition may also be satisfied when the second vehicle is within a threshold distance of the first vehicle, regardless of whether a geofence is calculated. When a geofence is calculated, the processor of the first mobile computing device may also be configured to determine a population density corresponding to the geographic location of the second vehicle, and to adjust the geofenced area based upon the population density.

Method of Generating and Broadcasting Telematics Data

As noted herein, telematics data associated with a first vehicle may be collected in real-time by a mobile device of a first driver. The mobile device may be specifically configured to gather or generate telematics and/or other driver/vehicle data in real-time as the vehicle is traveling. If a traffic event is encountered, about to be encountered, and/or expected or anticipated to be encountered by the vehicle as it travels, the telematics data collected may indicate such. The mobile device itself may be configured to identify the type of traffic event and transmit the type of traffic event to other mobile devices, a remote server, smart vehicles, and/or smart infrastructure. Additionally or alternatively, the mobile device may transmit the telematics data to other devices for analysis of the telematics data transmitted at those other devices (e.g., mobile devices, a remote server, smart vehicles, and/or smart infrastructure).

Figure 6:
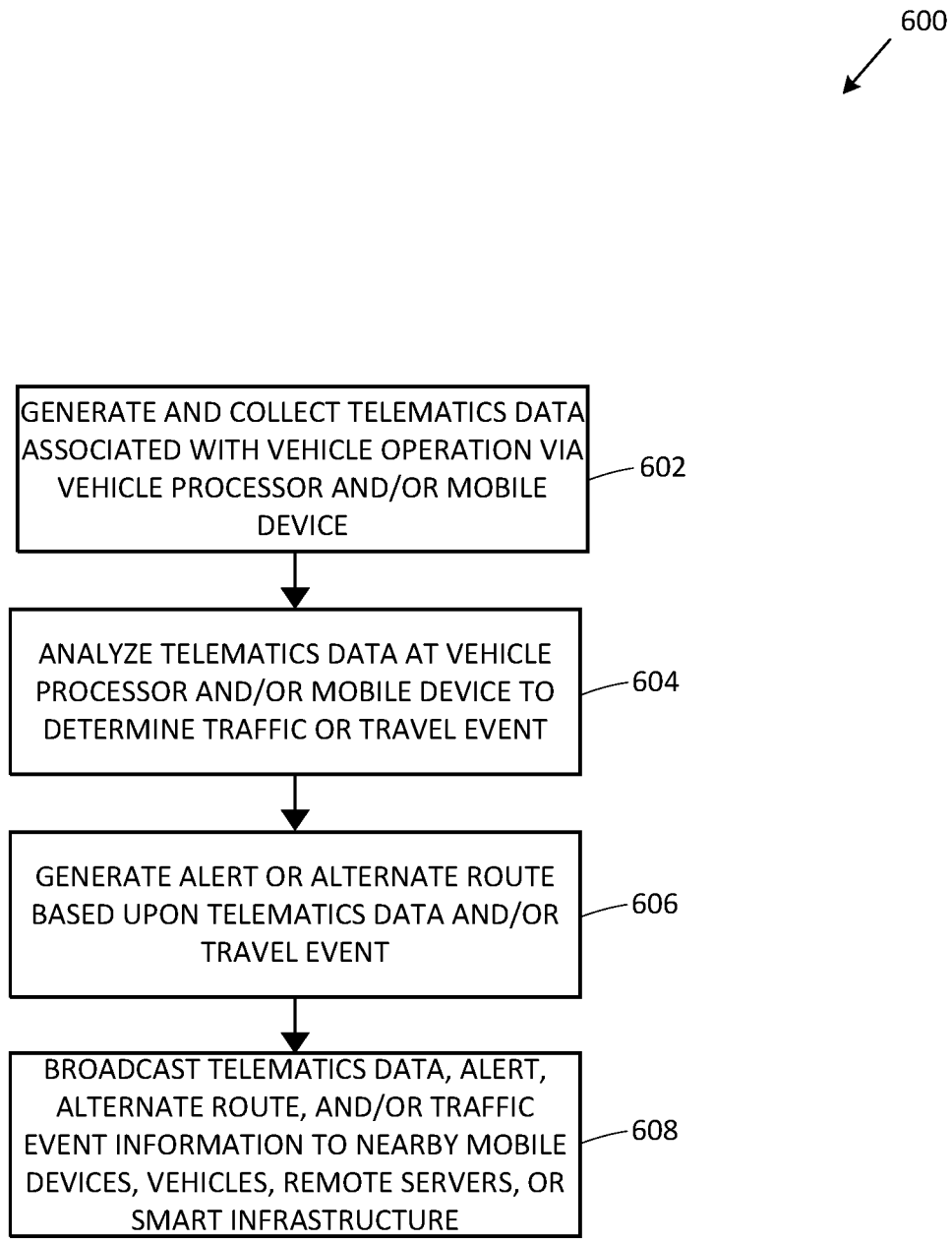
FIG. 6 illustrates an exemplary method 600 of generating telematics and/or other data at a source mobile device/vehicle, and/or broadcasting the data to other computing devices to facilitate safer driving.

In one aspect, a computer-implemented method of generating and broadcasting telematics (and/or other) data 600 may be provided, as depicted by FIG. 6. The method may include: (1) generating and/or collecting, at or by a mobile device and/or smart vehicle controller, telematics data associated with a first vehicle 602, (2) analyzing or reviewing, at or via the mobile device and/or smart vehicle controller, the telematics data associated with the first vehicle to determine that a travel event associated with the first vehicle exists (that is revealed by the telematics data) 604; (3) generating, at or via the mobile device and/or smart vehicle controller, a warning message (such as either visual or audible alert) associated with or detailing the travel event 606; and/or (4) transmitting or broadcasting (via wireless communication and/or data transmission), at or from the mobile device and/or smart vehicle controller, the warning message associated with or detailing the travel event 608 to (i) a second mobile device associated with a second driver, (ii) a second smart vehicle controller of a second vehicle associated with the second driver, (iii) smart infrastructure, and/or (iv) a remote server such that telematics data generated and/or collected by the mobile device or smart vehicle controller (and associated with the first (traveling) vehicle) may be used to facilitate safer driving and vehicle travel for other vehicles and drivers. The method 600 may include additional, fewer, or alternate actions, including those discussed elsewhere herein.

For example, the mobile device and/or smart vehicle controller may further (i) determine or extract a GPS or other location of the travel event, (ii) determine vehicles in the vicinity of the travel event (such as within a certain distance, e.g., 1 or 2 miles), and/or (iii) transmit the warning message to the vehicles in the vicinity of the travel event (or to mobile devices associated with owners of those vehicles). The mobile device and/or smart vehicle controller may further (i) determine or extract a GPS or other location of the travel event, (ii) determine vehicles in the vicinity of the travel event, (iii) calculate or determine alternate routes for the vehicles in the vicinity of the travel event (or to mobile devices associated with owners of those vehicles), and/or (iv) transmit the alternate routes to the vehicles in the vicinity of the travel event (or to mobile devices associated with owners of those vehicles) to facilitate re-routing traffic to safer travel routes using the telematics data gathered from an initial vehicle or mobile device involved with a travel event.

Exemplary End-User: Receiving & Analyzing Telematics Data

Figure 7:
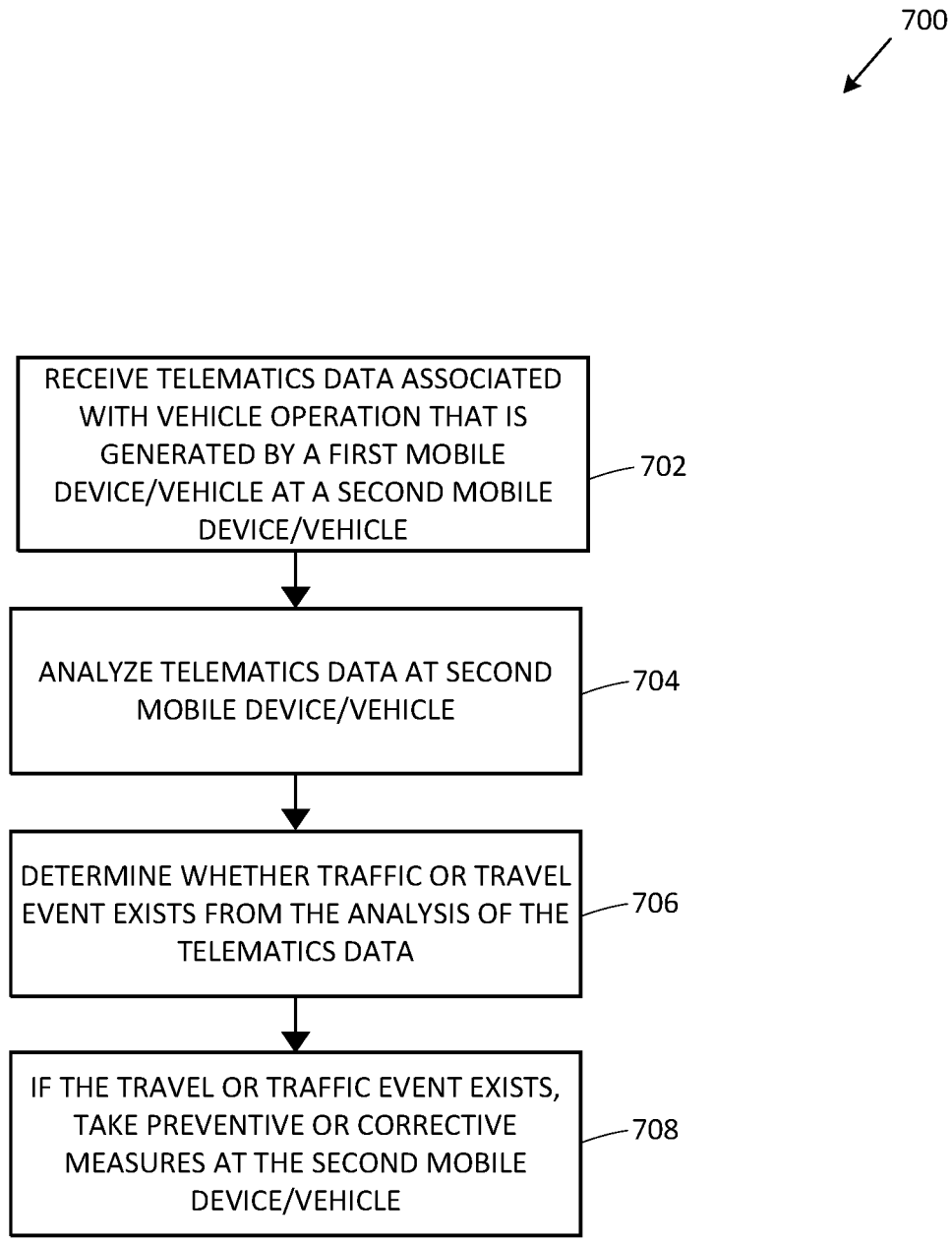
FIG. 7 illustrates an exemplary method 700 receiving and analyzing telematics and/or other data at a destination mobile device/vehicle to facilitate safer driving.

In one aspect, a computer-implemented method of using telematics (and/or other) data 700 may be provided, as depicted by FIG. 7. The method may include (a) receiving telematics (and/or other) data 702, at or by (1) a mobile device associated with a driver or (2) a smart vehicle controller of a vehicle associated with the driver, via wireless communication and/or data transmission, the telematics data being generated by a second mobile device or second smart vehicle associated with a second driver; (b) analyzing the telematics data, at or via the mobile device (or smart vehicle controller) 704; (c) determining, at or via the mobile device (or smart vehicle controller), that an abnormal travel condition (or traffic event) exists from the analysis of the telematics (and/or other) data 706; and/or (d) when the abnormal travel condition (or traffic event) exists, automatically taking a preventive or corrective action 708, at or via the mobile device (or smart vehicle controller), that alleviates a negative impact of the abnormal travel condition (or traffic event) on the driver and/or the vehicle to facilitate safer and/or more efficient vehicle travel. The method 700 may include additional, fewer, or alternate actions, including those discussed elsewhere herein.

For example, the abnormal condition may be based upon (and/or determined from telematics (and/or other) data that reveals) vehicle, traffic, congestion, road construction, and/or weather conditions. The telematics (and/or other) data (1) may be generated and/or collected by a second mobile device and/or a second smart vehicle (or second smart vehicle controller) associated with another driver, and/or (2) may include speed, acceleration, deceleration, location, lane information, and/or other data of, or associated with, the second mobile device, second smart vehicle, and/or one or more other vehicles. Additionally or alternatively, the telematics (and/or other) data (1) may be generated and/or collected by a second mobile device and/or a second smart vehicle (or second smart vehicle controller) associated with another driver, and/or (2) may include time, braking, acceleration, left turn, right turn, heading, GPS (Global Positioning System) speed, GPS latitude and longitude, gyroscope, battery level, and/or telephone usage information or data of, or associated with, the second mobile device, second smart vehicle, and/or one or more other vehicles.

The preventive or corrective action taken may be: (i) generating or determining an alert, at or via the mobile device (and/or smart vehicle controller); (ii) presenting a visual alert, at or via the mobile device (and/or smart vehicle controller), on a display or display screen associated with the mobile device (and/or smart vehicle controller); and/or (iii) providing an audio or audible alert, at or via the mobile device (and/or smart vehicle controller). The alert may be presented or provided only after the mobile device (or smart vehicle controller) determines that the abnormal travel condition (or traffic event) is relevant to the vehicle, such as by determining that a location of the abnormal travel condition (or traffic event) is in the vicinity of the vehicle and/or along a route that the vehicle is presently traveling. Additionally or alternatively, the preventive or corrective action taken may be: (i) generating, determining, and/or receiving an alternate travel route that avoids a GPS location of the travel or traffic event, at or via the mobile device (and/or smart vehicle controller); and/or (ii) presenting the alternative travel route, at or via the mobile device (and/or smart vehicle controller), on a display or display screen for use by the driver; and/or providing audio driving directions for the vehicle to travel along the alternate route. The preventive or corrective action taken may be: (i) generating, determining, and/or receiving an alternate travel route that avoids a GPS location of the travel or traffic event, at or via the mobile device (and/or smart vehicle controller); and/or (ii) automatically directing the vehicle to take or follow the alternative travel route, at or via the mobile device (and/or smart vehicle controller), such as by directing an autonomous vehicle to automatically take the alternate travel route.

The telematics data may be generated and/or collected by a second mobile device and/or a second smart vehicle (or second smart vehicle controller). The telematics (and/or other) data may be (1) generated and/or collected by a second mobile device and/or a second smart vehicle (or second smart vehicle controller), and/or (2) transmitted from the second mobile device and/or second smart vehicle directly to the mobile device (and/or smart vehicle controller) via wireless communication and/or data transmission (such as via peer-to-peer (P2P) communication). Additionally or alternatively, the telematics (and/or other) data may be (1) generated and/or collected by a second mobile device and/or a second smart vehicle (or second smart vehicle controller), and/or (2) transmitted from the second mobile device and/or second smart vehicle directly to a remote server (such as an insurance provider remote server), and then relayed or transmitted from the remote server to the mobile device (and/or smart vehicle controller) via wireless communication and/or data transmission.

The telematics (and/or other) data may be (1) generated and/or collected by a second mobile device and/or a second smart vehicle (or smart vehicle controller), and/or (2) transmitted from the second mobile device and/or second smart vehicle directly to smart infrastructure (such as a smart stop sign, smart street sign, smart toll both, and/or smart roadside equipment, markers, or reflectors), and then relayed or transmitted from the smart infrastructure to the mobile device (and/or smart vehicle controller) via wireless communication and/or data transmission. Additionally or alternatively, the telematics (and/or other) data may be (1) generated and/or collected by a second mobile device and/or a second smart vehicle (or second smart vehicle controller), and/or (2) transmitted from the second mobile device and/or second smart vehicle directly or indirectly to the mobile device (and/or smart vehicle controller), such as via (a) vehicle-to-vehicle wireless communication, (b) peer-to-peer (e.g., mobile device-to-mobile device) wireless communication, (c) vehicle-to-infrastructure wireless communication, and/or (d) infrastructure-to-vehicle wireless communication (and/or data transmission).

Exemplary End-User/Destination Devices

In one aspect, a computer-implemented method of using telematics and/or other data may be provided. The method may include (a) receiving telematics data, at or by (1) a mobile device associated with a driver, and/or (2) a smart vehicle controller of a vehicle associated with the driver, via wireless communication and/or data transmission; (b) determining, at or via the mobile device (or smart vehicle controller), (i) a travel (or traffic) event, or that the travel event exists, from analysis of the telematics data, and/or (ii) that a travel event message or warning associated with the travel event exists within, or is embedded within, the telematics data; and/or (c) if the travel event exits, automatically taking a preventive or corrective action, at or via the mobile device (or smart vehicle controller), that alleviates a negative impact of the travel event on the driver or vehicle to facilitate safer and/or more efficient vehicle travel. The method may include additional, fewer, or alternate actions, including those discussed elsewhere herein and/or directly above.

In another aspect, a computer-implemented method of using telematics data may be provided. The method may include (a) receiving a notification that an abnormal travel condition (or traffic event) exists, at or by (1) a mobile device associated with a driver, and/or (2) a smart vehicle controller of a vehicle associated with the driver, via wireless communication and/or data transmission, the notification being determined from telematics data collected or generated by (i) a second mobile device, and/or (ii) second smart vehicle (or smart vehicle controller) associated with a second driver; and/or (b) when the abnormal travel condition (or traffic event) exists, automatically taking a preventive or corrective action, at or via the mobile device (or smart vehicle controller), that alleviates a negative impact of the abnormal travel condition (or traffic event) on the driver and/or the vehicle to facilitate safer and/or more efficient vehicle travel. The abnormal condition (or traffic event) may be based upon (and/or determined from telematics data that reveals) vehicle, traffic, congestion, road construction, and/ or weather conditions, and the notification defines the type of abnormal condition (or traffic event) and/or an extent of the abnormal condition (or traffic event), such as by (a) length of time, or (b) size or area impacted by the abnormal condition (or traffic event). The telematics (and/or other) data may include speed, acceleration, deceleration, location, lane information, and/or other data of, or associated with, the second mobile device, second smart vehicle, and/or one or more other vehicles. The telematics (and/or other) data may include time, braking, acceleration, left turn, right turn, heading, GPS (Global Positioning System) speed, GPS latitude and longitude, gyroscope, battery level, and/or telephone usage information or data of, or associated with, the second mobile device, second smart vehicle, and/or one or more other vehicles. The method may include additional, fewer, or alternate actions, including those discussed elsewhere herein.

In another aspect, a computer-implemented method of using telematics (and/or other) data may be provided. The method may include: (a) receiving telematics and/or other data (and/or other electronic communications or wireless messages), at or by (1) a mobile device associated with a driver, and/or (2) a smart vehicle controller of a vehicle associated with the driver, via wireless communication and/or data transmission; (b) determining, at or via the mobile device (or smart vehicle controller), that a travel (or traffic) event message or warning associated with a travel (or traffic) event exists within, or is embedded within, the telematics and/or other data (and/or other electronic communications or wireless messages), the travel (or traffic) event being determined from telematics and/or other data collected or generated by a second mobile device associated with a second driver (or a second smart vehicle controller of another vehicle associated with the second driver); and/or (c) if so, (i) presenting the travel (or traffic) event message or warning, at or via the mobile device (or smart vehicle controller), on a display or display screen associated with the mobile device (or smart vehicle controller); and/or (ii) providing an audible or audio alert associated with the travel (or traffic) event message or warning to alleviate a negative impact of the travel (or traffic) event on the driver and/or the vehicle to facilitate safer and/or more efficient vehicle travel.

The travel (or traffic) event message or warning may be presented only after the mobile device (or smart vehicle controller) determines that the traffic event message or warning is relevant to the vehicle, such as by determining that a location of the travel (or traffic) event is in the vicinity of the vehicle, a GPS position associated with the vehicle, and/or along a route that the vehicle is traveling. The telematics and/or other data may be transmitted from the second mobile device and/or second smart vehicle directly or indirectly to the mobile device (and/or smart vehicle controller), such as via (a) vehicle-to-vehicle wireless communication, (b) peer-to-peer (e.g., mobile device-to-mobile device) wireless communication, (c) vehicle-to-infrastructure wireless communication, and/or (d) infrastructure-to-vehicle wireless communication (and/or data transmission). The method may include additional, fewer, or alternate actions, including those discussed elsewhere herein.

Exemplary End-User Device & GPS Comparison

In one aspect, a computer-implemented method of using telematics (and/or other) data may be provided. The method may include (a) receiving telematics data, at or by (1) a mobile device associated with a driver, and/or (2) a smart vehicle controller of a vehicle associated with the driver, via wireless communication and/or data transmission; (b) analyzing or reviewing the telematics data, at or by the mobile device (or smart vehicle controller) to determine that a travel event exists (that is revealed by the telematics data) based upon a GPS (Global Positioning System) location of the travel event (such as revealed by the telematics data); (c) if so, then further determining if the travel event presents an issue or problem for the driver (e.g., owner of the mobile device or smart vehicle), via the mobile device (or smart vehicle controller), such as by determining that the GPS location of the travel event is located along or on the current travel route of the vehicle, and/or in a vicinity or ahead of the current GPS location of the mobile device (or smart vehicle controller); and/or (d) if so, automatically taking a preventive or corrective action, at or via the mobile device (or smart vehicle controller) that alleviates a negative impact of the travel event on the driver and/or vehicle to facilitate safer and/or more efficient vehicle travel. The method may include additional, fewer, or alternate actions, including those discussed elsewhere herein.

For instance, the preventive or corrective action taken may be: generating or determining an alert, at or via the mobile device (and/or smart vehicle controller); presenting a visual alert, at or via the mobile device (and/or smart vehicle controller), on a display or display screen associated with the mobile device (and/or smart vehicle controller); and/or providing an audio or audible alert, at or via the mobile device (and/or smart vehicle controller). The preventive or corrective action taken may be: generating, determining, or receiving an alternate travel route that avoids the GPS location of the travel event, at or via the mobile device (and/or smart vehicle controller); and/or presenting the alternative travel route, at or via the mobile device (and/or smart vehicle controller), on a display or display screen for use by the driver. Additionally or alternatively, the preventive or corrective action taken may be: generating an alternate travel route that avoids the GPS location of the travel event, at or via the mobile device (and/or smart vehicle controller); and/or automatically directing the vehicle to take or follow the alternative travel route, at or via the mobile device (and/or smart vehicle controller), such as by directing an autonomous or semi-autonomous vehicle to take the alternate travel route.

Exemplary End-User Device & GPS Comparison

In one aspect, a computer-implemented method of using telematics (and/or other) data may be provided. The method may include (a) receiving telematics data, at or by (1) a mobile device associated with a driver, and/or (2) a smart vehicle controller of a vehicle associated with the driver, via wireless communication and/or data transmission; (b) analyzing or reviewing the telematics data, at or by the mobile device (or smart vehicle controller) to determine that a travel event exists (that is revealed by the telematics data); (c) comparing a GPS (Global Positioning System) location, at or by the mobile device (or smart vehicle controller), of the travel event (such as revealed by the telematics data) with a current GPS location or current travel route of the mobile device (and/or smart vehicle controller); (d) based upon the comparison, determining if the travel event presents an issue or problem for the driver of the vehicle, via the mobile device (or smart vehicle controller), such as by determining that the GPS location of the travel event is located along or on the current travel route of the vehicle, and/or in a vicinity (e.g., within a predetermined distance (such as 5 miles for highway travel, or 3 blocks for city street travel)) or ahead of the current GPS location of the mobile device (or smart vehicle controller); and/or (e) if so, automatically taking a preventive or corrective action, at or via the mobile device (or smart vehicle controller) that alleviates a negative impact of the travel event on the driver to facilitate safer and/or more efficient vehicle travel. The method may include additional, fewer, or alternate actions, including those discussed elsewhere herein.

For instance, the preventive or corrective action taken may be: generating or determining alert, at or via the mobile device (and/or smart vehicle controller); presenting a visual alert, at or via the mobile device (and/or smart vehicle controller), on a display or display screen associated with the mobile device (and/or smart vehicle controller); and/or providing an audio or audible alert, at or via the mobile device (and/or smart vehicle controller).

The preventive or corrective action taken may be: generating, determining, or receiving an alternate travel route that avoids the GPS location of the travel event, at or via the mobile device (and/or smart vehicle controller); and/or presenting the alternative travel route, at or via the mobile device (and/or smart vehicle controller), on a display or display screen for use by the driver. Additionally or alternatively, the preventive or corrective action taken may be: generating, determining, and/or receiving an alternate travel route that avoids the location of the travel event, at or via the mobile device (and/or smart vehicle controller); and/or automatically directing the vehicle to take or follow the alternative travel route, at or via the mobile device (and/or smart vehicle controller), such as by directing an autonomous vehicle to take the alternate travel route.

Exemplary Smart Infrastructure or Remote Server

Figure 8:
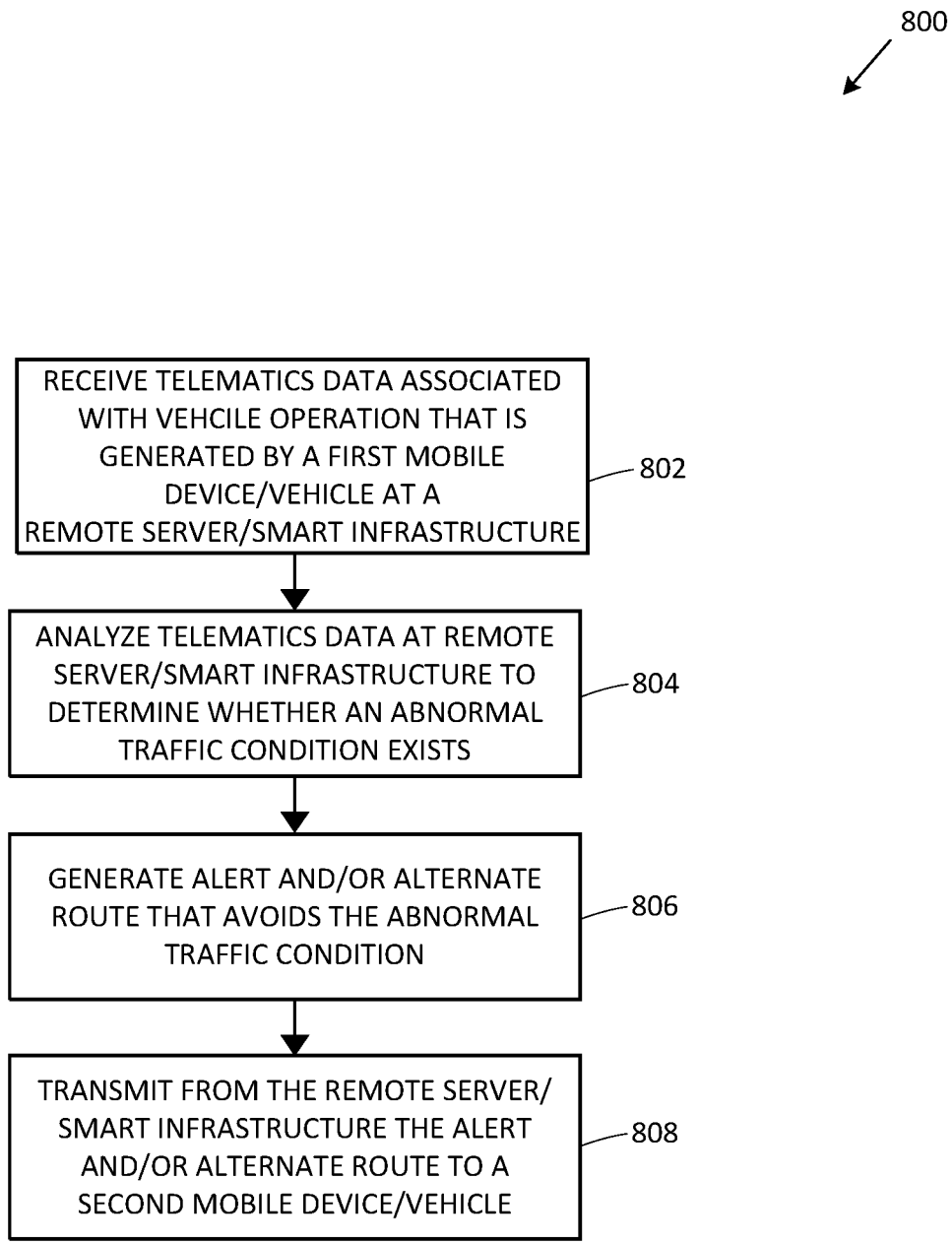
FIG. 8 illustrates an exemplary method 800 receiving and analyzing telematics and/or other data at an intermediary computing device, such as a remote server/smart infrastructure, and/or broadcasting the data to other computing devices to facilitate safer driving.

In one aspect, a computer-implemented method of using telematics (and/or other) data 800 may be provided, as depicted by FIG. 8. The method 800 may include: (1) receiving telematics data, at or by a remote server, and/or smart infrastructure (or associated equipment or processors) 802, via wireless communication and/or data transmission, the telematics data being generated, collected, and/or transmitted by (a) a mobile device associated with a driver, and/or (b) a smart vehicle controller of a vehicle associated with the driver; (2) analyzing or reviewing, at or via the remote server and/or smart infrastructure, the telematics data received from the mobile device and/or smart vehicle controller to determine that a travel event associated with the vehicle or driver exists (that is revealed by the telematics data) 804; (3) generating, at or via the remote server and/or smart infrastructure, a warning message (such as either visual or audible alert) associated with or detailing the travel event 806; and/or (4) transmitting (via wireless communication and/or data transmission), at or from the remote server and/or smart infrastructure, the warning message associated with or detailing the travel event 808 to (i) a second mobile device associated with a second driver, and/or (ii) a second smart vehicle controller of a second vehicle associated with the second driver such that telematics data generated and/or collected by one mobile device or vehicle may be used to facilitate safer driving and vehicle travel for other vehicles and drivers. The method 808 may include additional, fewer, or alternate actions, including those discussed elsewhere herein.

For example, the remote server and/or smart infrastructure may further (i) determine or extract a GPS or other location of the travel event, (ii) determine vehicles in the vicinity of the travel event (such as within a certain distance, e.g., 1 or 2 miles), and/or (iii) transmit the warning message to the vehicles in the vicinity of the travel event (or to mobile devices associated with owners of those vehicles). The remote server and/or smart infrastructure may further (i) determine or extract a GPS or other location of the travel event, (ii) determine vehicles in the vicinity of the travel event, (iii) calculate or determine alternate routes for the vehicles in the vicinity of the travel event (or to mobile devices associated with owners of those vehicles), and/or (iv) transmit the alternate routes to the vehicles in the vicinity of the travel event (or to mobile devices associated with owners of those vehicles) to facilitate re-routing traffic to safer travel routes using the telematics data gathered from an initial vehicle or mobile device involved with a travel event.

Exemplary Computer Server or Smart Infrastructure

In one aspect, a computer server (or smart infrastructure) configured to re-route traffic using telematics and/or other data may be provided. The computer server may include (1) a receiver configured to receive telematics data via wireless communication and/or data transmission, the telematics data being generated and transmitted by a first mobile device and/or first vehicle; (2) a processor configured to analyze the telematics data received to determine a travel or traffic events associated with the first mobile device and/or first vehicle exists, wherein the processor is further configured to generate a warning message associated with the travel or traffic event (such as a virtual, visual, haptic, or audible alert); and/or (3) a transmitter configured to transmit the warning message to a second mobile device and/or second vehicle via wireless communication and/or data transmission to facilitate safer travel of the second vehicle using telematics data gathered, collected, or generated by the first mobile device and first vehicle. The processor may be configured to calculate or determine an alternate route that bypasses the travel or traffic event, and direct a transmission of the alternate route to the second mobile device and/or second vehicle via wireless communication and/or data transmission. The computer server and/or smart infrastructure may include additional, fewer, and/or alternate components (and functionality), including those discussed elsewhere herein.

Exemplary Source Mobile Device Generating & Transmitting the Telematics Data

In one aspect, a mobile device configured for telematics and/or other data collection, generation, and/or transmission may be provided. The mobile device may include (1) a processor configured to collect acceleration, braking, gyroscope, compass heading, turning, speed, and/or location-related data of a traveling vehicle at least once every second (i.e., approximately constantly or otherwise periodically), the processor further configured to generate a broadcast and/or wireless communication message that incorporates the acceleration, braking, gyroscope, compass heading, turning, speed, and/or location-related data collected; and/or (2) a transmitter configured to transmit via wireless communication or data transmission the broadcast and/or wireless communication message to nearby vehicles and/or roadside infrastructure to facilitate safer vehicle travel for other vehicles using the telematics data of the traveling vehicle collected and transmitted by the mobile device. The mobile device may be configured with additional, less, or alternate functionality, including that discussed elsewhere herein.

Exemplary End-User Device: Listening for Telematics Broadcast

In one aspect, a mobile device configured to listen for a telematics data transmission and then receive that transmission may be provided. The mobile device may include (1) a processor configured to listen for a telematics data broadcast or transmission transmitted by a nearby vehicle and/or roadside infrastructure, the telematics data including acceleration, braking, gyroscope, compass heading, turning, speed, and/or location-related data of a traveling vehicle at least once every second (i.e., approximately, constantly or otherwise periodically), the processor further configured to turn on a receiver when it is determined that the telematics broadcast or transmission exists (and/or is within reception range); and/or (2) a receiver configured to receive via wireless communication or data transmission the telematics data broadcast or transmission transmitted from the nearby vehicle and/or roadside infrastructure, wherein the processor is further configured to analyze telematics data embedded within the telematics data broadcast or transmission to determine (i) that a travel or traffic event associated with another vehicle has occurred; and/or (ii) a location of the travel or traffic event, and if a relevant travel or traffic event is determined by the processor to be in the vicinity (such as within a few blocks or a few miles), and/or along a current route, of the mobile device or an associated vehicle, the processor takes or directs a corrective or preventive action to facilitate safer vehicle travel for the vehicle by using the telematics data of another vehicle collected and transmitted within the telematics data broadcast or transmission. The corrective or preventive action may be to generate a warning or alert (such as either visual or audible) to a driver of the vehicle. The corrective or preventive action may be to generate an alternate route for the vehicle that avoids a GPS location of the travel or traffic event, and/or then re-routes the vehicle to avoid the travel or traffic event. The mobile device may include additional, less, or alternate functionality, including that discussed elsewhere herein.

Exemplary Remote Server

In one aspect, a remote server configured to use telematics and/or other data from one driver to facilitate safer vehicle travel for another driver may be provided. The remote server may include (1) a receiver (or transceiver) configured to receive a data transmission and/or wireless communication containing or including telematics data, the telematics data being generated and/or transmitted from a first mobile device and/or first smart vehicle (associated with a first driver); (2) a database and/or memory unit storing vehicle navigation information, virtual road maps, and/or computer-readable instructions; (3) a processor configured to access the database and/or memory unit, wherein the processor is configured to automatically identify or determine (i) a travel (or traffic) event; (ii) a GPS or other location of the travel event; and/or (iii) an estimated or actual geographical and/or temporal scope of the travel event from computer analysis of the telematics data, the processor further being configured to generate a travel event-related data transmission and/or wireless communication associated with, corresponding to, and/or detailing the travel event, and/or location and/or extent thereof; and/or (4) a transmitter (or transceiver) configured to transmit the travel event-related data transmission and/or wireless communication to a second mobile device and/or second smart vehicle (associated with a second driver of a second vehicle) to facilitate the second mobile device and/or second smart vehicle taking corrective action to enable safer vehicle travel for the second driver based upon the telematics date associated with the first driver. The remote server may include additional, less, or alternate functionality, including that discussed elsewhere herein and/or below.

Exemplary Smart Road-Side Infrastructure

In another aspect, a smart road-side infrastructure processor or server configured to use telematics and/or other data from one driver to facilitate safer vehicle travel for another driver may be provided. The smart road-side infrastructure processor or server may include (1) a receiver (or transceiver) configured to receive a data transmission and/or wireless communication containing or including telematics data, the telematics data being generated and/or transmitted from a first mobile device or first smart vehicle (associated with a first driver); (2) a database and/or memory unit storing vehicle navigation information, virtual road maps, and/or computer-readable instructions; (3) a processor configured to access the database and/or memory unit, wherein the processor is configured to automatically identify or determine (i) a travel (or traffic) event; (ii) a GPS or other location of the travel event; and/or (iii) an estimated or actual geographical and/or temporal scope of the travel event from computer analysis of the telematics data, the processor further being configured to generate a travel event-related data transmission and/or wireless communication associated with, corresponding to, and/or detailing the travel event, and/or location and/or extent thereof; and/or (4) a transmitter (or transceiver) configured to transmit the travel event-related data transmission and/or wireless communication to a second mobile device and/or second smart vehicle (associated with a second driver of a second vehicle) to facilitate the second mobile device and/or second smart vehicle taking corrective action to enable safer vehicle travel for the second driver based upon the telematics date associated with the first driver. The smart road-side infrastructure may include additional, less, or alternate functionality, including that discussed elsewhere herein and/or below.

Exemplary Intermediate Mobile Device/Smart Vehicle

In one aspect, an intermediate mobile device or smart vehicle configured to use telematics and/or other data from one driver to facilitate safer vehicle travel for another driver may be provided. The intermediate mobile device or smart vehicle may include (1) a receiver (or transceiver) configured to receive a data transmission and/or wireless communication containing or including telematics data, the telematics data being generated and/or transmitted from a first (or source) mobile device or first (or source) smart vehicle (associated with a first driver); (2) a database and/or memory unit storing vehicle navigation information, virtual road maps, and/or computer-readable instructions; (3) a processor configured to access the database and/or memory unit, wherein the processor is configured to automatically identify or determine (i) a travel (or traffic) event; (ii) a GPS or other location of the travel event; and/or (iii) an estimated or actual geographical and/or temporal scope of the travel event from computer analysis of the telematics data, the processor further being configured to generate a travel event-related data transmission and/or wireless communication associated with, corresponding to, and/or detailing the travel event, and/or location and/or extent thereof; and/or (4) a transmitter (or transceiver) configured to transmit the travel event-related data transmission and/or wireless communication to a second (or destination) mobile device and/or second (or destination) smart vehicle (associated with a second driver of a second vehicle), such as via peer-to-peer (P2P) communication, to facilitate the second (or destination) mobile device and/or second (or destination) smart vehicle taking corrective action to enable safer vehicle travel for the second driver based upon the telematics data associated with the first driver. The intermediate mobile device or smart vehicle may include additional, less, or alternate functionality, including that discussed elsewhere herein and/or directly below.

For instance, for the (a) remote server, (b) smart road-side infrastructure, and/or (c) intermediate mobile device or smart vehicle mentioned above, the travel (or traffic) event may be based upon (and/or determined from telematics data that reveals) vehicle, traffic, congestion, road construction, and/or weather conditions. The telematics data may include speed, acceleration, deceleration, location, lane information, and/or other data of, or associated with, the first mobile device and/or first smart vehicle. The telematics data may include time, braking, acceleration, left turn, right turn, heading, GPS (Global Positioning System) speed, GPS latitude and longitude, gyroscope, battery level, and/or telephone usage information or data of, or associated with, the first mobile device and/or first smart vehicle.

The preventive or corrective action taken may be: generating or determining an alert, at or via the second mobile device and/or second smart vehicle (or second smart vehicle controller); presenting a visual alert, at or via the second mobile device and/or second smart vehicle (or second smart vehicle controller), on a display or display screen associated with the mobile device (and/or smart vehicle controller); and/or providing an audible alert, at or via the second mobile device and/or second smart vehicle. The alert may be presented only after the second mobile device (or second smart vehicle or vehicle controller) determines that the travel event is relevant to the second vehicle, such as by determining that a location of the travel event is in the vicinity of the second vehicle and/or along a route that the second vehicle is presently traveling.

The preventive or corrective action taken may be: generating, determining, and/or receiving an alternate travel route that avoids a GPS location of the travel (or traffic) event, at or via the second mobile device and/or second smart vehicle (or vehicle controller); and/or presenting the alternative travel route, at or via the second mobile device and/or second smart vehicle (or vehicle controller), on a display or display screen for use by the driver. Additionally or alternatively, the preventive or corrective action taken may be: generating, determining, and/or receiving an alternate travel route that avoids a GPS location of the travel (or traffic) event, at or via the second mobile device and/or second smart vehicle (or vehicle controller); and/or automatically directing the second vehicle to take or follow the alternative travel route, at or via the second mobile device and/or second smart vehicle (or vehicle controller), such as by directing an autonomous vehicle to take the alternate travel route.

The (a) remote server, (b) smart road-side infrastructure, and/or (c) intermediate mobile device or smart vehicle may be configured to: listen for a telematics data-related wireless communication and/or data transmission, and when the telematics data-related wireless communication and/or data transmission is detected and/or within range, then (i) receive the telematics data-related wireless communication and/or data transmission; (ii) store associated telematics data in a memory unit; and/or (iii) relay or otherwise re-transmit the telematics data and/or the telematics data-related wireless communication and/or data transmission to other listening devices, such as other vehicles, mobile device, remote servers, and/or smart infrastructure.

Exemplary Source Mobile Device

In one aspect, a mobile device configured to collect and transmit telematics data (such as when the mobile device is traveling in a moving vehicle associated with a first driver) may be provided. The mobile device may include one or more sensors or meters configured for collecting and/or gathering telematics data; a memory unit storing computer readable instructions; a transceiver (or a receiver and transmitter); and a processor interconnected or in communication with the one or more sensors or meters; the memory unit; and/or the transceiver. The processor may be configured to: receive telematics data from the one or more sensors or meters; analyze the telematics data, and determine or identify that a travel or traffic event exists; generate a message (e.g., a data transmission or wireless communication) associated with the telematics data and/or detailing the type and/or extent of the travel or traffic event; and/or direct a transmission of the message via data transmission and/or wireless communication to another computing device (such as another mobile device, another vehicle, a remote server, and/or smart infrastructure processors or servers) to facilitate safer travel for another vehicle and/or a second driver based upon the telematics data collected by the first mobile device.

The travel (or traffic) event may be based upon (and/or determined from telematics data that reveals) vehicle, traffic, congestion, road construction, and/or weather conditions. The telematics and/or other data may include speed, acceleration, deceleration, location, lane information, and/or other data of, or associated with, the first mobile device and/or first smart vehicle. The telematics and/or other data may include time, braking, acceleration, left turn, right turn, heading, GPS (Global Positioning System) speed, GPS latitude and longitude, gyroscope, battery level, and/or telephone usage information or data of, or associated with, the mobile device and/or moving smart vehicle. The mobile device may include additional, less, or alternate functionality, including that discussed elsewhere herein.

Exemplary Source Smart Vehicle (or Smart Vehicle Controller)

In one aspect, a smart vehicle (or vehicle controller) configured to collect and transmit telematics and/or other data (such as when the smart vehicle is traveling, the smart vehicle being associated with a first driver) may be provided. The smart vehicle (or vehicle controller) may include: one or more sensors or meters configured for collecting and/or gathering telematics data; a memory unit storing computer readable instructions; a transceiver (or a receiver and transmitter); and/or a processor interconnected or in communication with the one or more sensors or meters; the memory unit; and/or the transceiver. The processor may be configured to: receive telematics data from the one or more sensors or meters; analyze the telematics data, and determine or identify that a travel or traffic event exists; generate a message (e.g., a data transmission or wireless communication) associated with the telematics data and/or detailing the type and/or extent of the travel or traffic event; and/or direct a transmission of the message via data transmission and/or wireless communication to another computing device (such as a mobile device, another vehicle, a remote server, and/or smart infrastructure processors or servers) to facilitate safer travel for another vehicle and/or a second driver based upon the telematics data collected by the smart vehicle (and/or smart vehicle controller).

The travel (or traffic) event may be based upon (and/or determined from telematics data that reveals) vehicle, traffic, congestion, road construction, and/or weather conditions. The telematics and/or other data may include speed, acceleration, deceleration, location, lane information, and/or other data of, or associated with, the smart vehicle and/or a mobile device of the driver. The telematics and/or other data includes time, braking, acceleration, left turn, right turn, heading, GPS (Global Positioning System) speed, GPS latitude and longitude, gyroscope, battery level, and/or telephone usage information or data of, or associated with, the smart vehicle. The smart vehicle (or vehicle controller) may include additional, less, or alternate functionality, including that discussed elsewhere herein, and/or discussed with mobile devices, remote servers, and/or smart infrastructure.

Exemplary Destination Mobile Device

In one aspect, a mobile device configured to receive telematics and/or other data (such as when the mobile device is traveling in a moving vehicle associated with a first driver) and take corrective action when a travel event exists may be provided. The mobile device may include: a memory unit storing computer readable instructions; a transceiver (or a receiver and transmitter); and/or a processor interconnected or in communication with the memory unit, and/or the transceiver. The processor and/or transceiver may be configured to: receive telematics data generated from an originating vehicle (or mobile device traveling within the originating vehicle) or a telematics-related message via a data transmission and/or wireless communication; (i) analyze the telematics data, and determine or identify that a travel (or traffic) event exists (that is associated with the originating vehicle) or (ii) otherwise determine that the travel event exists from analysis of the telematics-related message; and/or when the travel event is determined to exist, determine whether the travel event is relevant to the moving vehicle and/or a route that the moving vehicle is presently traveling, and if so, take or direct corrective action such that safer vehicle travel for the moving vehicle is facilitated based upon (a) the telematics data that is collected by the originating vehicle and/or (b) information regarding the travel event that the originating vehicle has encountered or is presently encountering.

The travel (or traffic) event may be based upon (and/or determined from the telematics data that reveals) vehicle, traffic, congestion, road construction, and/or weather conditions. The telematics and/or other data may include speed, acceleration, deceleration, location, lane information, and/or other data of, or associated with, the originating vehicle or a mobile device traveling within the originating vehicle. The telematics and/or other data includes time, braking, acceleration, left turn, right turn, heading, GPS (Global Positioning System) speed, GPS latitude and longitude, gyroscope, battery level, and/or telephone usage information or data of, or associated with, the originating vehicle or a mobile device traveling within the originating vehicle. The corrective action may include (i) generating, displaying, and/or providing an alert for the driver of the moving vehicle; and/or (ii) re-routing the moving vehicle to avoid an area associated with the travel event. The mobile device may include additional, less, or alternate functionality, including that discussed elsewhere herein.

Exemplary Destination Smart Vehicle

In one aspect, a smart vehicle (or smart vehicle controller) configured to receive telematics and/or other data (such as when the smart vehicle is traveling, the smart vehicle being associated with a first driver) and take corrective action when a travel event exists may be provided. The smart vehicle (or smart vehicle controller) may include a memory unit storing computer readable instructions, vehicle navigation information, and/or virtual road maps; a transceiver (or a receiver and transmitter); and/or a processor interconnected or in communication with the memory unit, and/or the transceiver. The processor and/or transceiver may be configured to: receive telematics data generated from an originating vehicle (or mobile device traveling within the originating vehicle) or a telematics-related message via a data transmission and/or wireless communication; (i) analyze the telematics data, and determine or identify that a travel (or traffic) event exists (that is associated with the originating vehicle) or (ii) otherwise determine that the travel event exists from analysis of the telematics-related message; and/or when the travel event is determined to exist, determine whether the travel event is relevant to the moving vehicle and/or a route that the moving vehicle is presently traveling (such as by comparing a GPS or other location of the travel event and a present GPS or other location of the smart vehicle), and if so, take or direct corrective action such that safer vehicle travel for the smart vehicle is facilitated based upon (a) the telematics data that is collected by the originating vehicle and/or (b) information regarding the travel event that the originating vehicle has encountered or is presently encountering.

The travel (or traffic) event may be based upon (and/or determined from the telematics data that reveals) vehicle, traffic, congestion, road construction, and/or weather conditions. The telematics data may include speed, acceleration, deceleration, location, lane information, and/or other data of, or associated with, the originating vehicle or a mobile device traveling within the originating vehicle. The telematics data may include time, braking, acceleration, left turn, right turn, heading, GPS (Global Positioning System) speed, GPS latitude and longitude, gyroscope, battery level, and/or telephone usage information or data of, or associated with, the originating vehicle or a mobile device traveling within the originating vehicle. The corrective action may include (i) generating, providing, and/or displaying an alert (such as either an audible or visual alert or recommendation) for the driver of the moving vehicle; (ii) calculating another route to a destination that avoids the travel event and/or displaying that route; (iii) receiving an alternate route that avoids the travel event; and/or (iv) re-routing the moving vehicle to avoid an area associated with the travel event. The smart vehicle (or vehicle controller) may include additional, less, or alternate functionality, including that discussed elsewhere herein, and/or discussed with mobile devices, remote servers, and/or smart infrastructure.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or vehicle that are configured to receive telematics data associated with other vehicles and/or abnormal road or travel conditions that other drivers are experiencing. The telematics may be received directly from other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk averse behavior and/or safer driving with lower insurance premiums, rates, and/or increased discounts, such as for usage-based or other types of auto insurance.

Furthermore, an insurance provider may promote or reward the use of one or more aspects described herein with lower insurance premiums, rates, and/or increased discounts. For example, an insurer may provide discounts or other incentives upon an insured customer installing an application to their mobile computing device that enables the mobile computing device to broadcast telematics data and/or to generate alert notifications based upon telematics data received from other devices.

Additionally or alternatively, an insurer may provide discounts or other incentives upon an amount that an insured customer uses the telematics application on their mobile computing device that enables the mobile computing device to broadcast telematics data and/or to generate alert notifications based upon telematics data received from other devices. Such usage-based discounts or incentives may be based upon amount of time of, or number of miles of, use or usage, e.g., an amount of time or miles that the insured drove during a specific period with a Telematics App running or executing on their mobile device (which was located within the insured vehicle as it travels), the Telematics App configured to collect and broadcast telematics data, and/or to receive telematics data from other vehicles or devices, and generate alerts or recommendations based upon the data received.

Originating Mobile Device Generating the Telematics Data

In one aspect, a computer-implemented method of generating and broadcasting telematics data may be provided. The method may include (1) generating or collecting telematics data at, or by, a originating or source mobile device associated with a driver (or an associated processor), the originating mobile device: (i) having a Telematics Application (or "App") installed or stored locally in a non-transitory computer-readable memory unit, and (ii) is associated with a second driver, the telematics data including acceleration, braking, speed, heading, and location data associated with the operation of an originating vehicle. The method may include (2) generating, at or by the originating mobile device (or associated processor) or the Telematics App, an updated telematics data broadcast (or wireless communication) including up-to-date telematics data at least every few seconds; and/or (3) broadcasting, at or by the origination mobile device (or an associated transceiver) or the Telematics App. The updated telematics data may be broadcast at least every few seconds via wireless communication and/or data transmission (or otherwise via a secure electronic communication network requiring login credential electronic verification) to other computing devices (e.g., nearby vehicles, mobile devices, smart infrastructure, or remote servers) to facilitate the other computing devices (i) determining that an abnormal travel condition (or traffic event) exists from the analysis of the telematics data received from the originating mobile device having the Telematics App, and (ii) when the abnormal travel condition (or traffic event) exists, automatically taking a preventive or corrective action, such as at or via a destination mobile device or smart vehicle controller (or an associated processor), that alleviates a negative impact of the abnormal travel condition (or traffic event) on the driver and/or the destination vehicle. As a result, safer and/or more efficient vehicle travel may be achieved.

The method may include additional, less, or alternate actions, including those discussed elsewhere herein, and/or may be implemented by one or more processors, and/or via computer-executable instructions stored on non-transitory computer-readable medium or media. For instance, the Telematics App, and/or the telematics data generated by the Telematics App on the originating mobile device, may indicate that the originating vehicle is experiencing high traffic conditions, congestion, road construction, or extreme weather conditions, such as from analysis of the telematics data. The telematics data may include speed, acceleration, deceleration, GPS location, lane information, and/or other data of, or associated with, the originating vehicle. Additionally or alternatively, the telematics data may include time, braking, acceleration, left turn, right turn, heading, GPS (Global Positioning System) speed, GPS latitude and longitude, gyroscope, battery level, and/or telephone usage information or data of, or associated with, the originating vehicle.

The preventive or corrective action taken by the destination mobile device or vehicle may be: (1) generating or determining an alert, at or via the destination mobile device or smart vehicle controller (or an associated processor); (2) presenting a visual alert, at or via a destination mobile device or smart vehicle controller, on a display or display screen associated with the destination mobile device or smart vehicle controller, respectively; and/or (3) providing an audio or audible alert, at or via a destination mobile device or smart vehicle controller (or an associated processor). Additionally or alternatively, the preventive or corrective action taken may be: (i) generating, determining, and/or receiving an alternate travel route that avoids a GPS location of the travel or traffic event, at or via a destination mobile device or smart vehicle controller; (ii) presenting the alternative travel route, at or via the destination mobile device or smart vehicle controller, on a display or display screen for use by the driver; and/or (iii) providing audio driving directions for the destination vehicle or driver to travel along the alternate route.

The telematics data may be generated and/or collected by the originating mobile device (and/or the Telematics App executing thereon). The telematics data may be (1) transmitted from a transceiver mounted on, or within, the originating mobile device indirectly or directly to a destination mobile device or smart vehicle controller via peer-to-peer (P2P) wireless communication and/or data transmission, or via a secure electronic communication network; (2) transmitted from the originating mobile device directly (or indirectly) to a remote server (such as an insurance provider remote server), and then relayed or transmitted from the remote server to a destination mobile device or smart vehicle controller via wireless communication and/or data transmission; and/or (3) transmitted from the originating mobile device directly (or indirectly) to smart infrastructure (such as a smart stop sign, smart street sign, smart toll both, and/or smart road-side equipment, markers, or reflectors), and then relayed or transmitted from the smart infrastructure to a destination mobile device or smart vehicle controller via wireless communication or data transmission. The telematics data may be transmitted over a secure electronic or wireless communication network.

The computer-implemented method may also include, with customer permission or affirmative consent, (i) determining or identifying, by one or more processors associated with an insurance provider remote server, an insured customer having a mobile device configured with the telematics data-based risk mitigation or prevention functionality discussed herein and/or the Telematics App; (ii) monitoring, by the one or more processors associated with the remote server, a time amount and/or mileage amount that the insured customer drives an insured vehicle with the telematics data-based risk mitigation or prevention functionality discussed herein, or the Telematics App, enabled and/or executing on their mobile device; and/or (iii) adjusting or modifying, by the one or more processors associated with the remote server, an insurance policy, premium, or discount for the insured customer based upon their usage and/or amount that they use or employ the telematics data-based risk mitigation or prevention functionality and/or Telematics App, such as generating a usage-based discount that is tied to an amount that the telematics data-based risk mitigation or prevention functionality (including generating, collecting, and/or broadcasting (and/or even receiving) telematics data as discussed herein, and/or generating appropriate alerts or recommendations from the telematics data) is used or otherwise employed.

In another aspect, a source or originating mobile device configured to collect, generate, and/or transmit telematics data (such as when the mobile device is traveling in a moving vehicle associated with a driver) may be provided. The mobile device may include (1) one or more sensors or meters configured for collecting and/or gathering telematics data; (2) a memory unit storing computer readable instructions; (3) a transceiver (or a receiver and transmitter); and/or (4) one or more processors interconnected or in communication with the one or more sensors or meters; the memory unit; and/or the transceiver. The one or more processors may execute a Telematics Application ("App") or may be otherwise configured to: (i) receive telematics data from the one or more sensors or meters, the telematics data including acceleration, braking, gyroscope, compass heading, turning, speed, and/or location-related data; (ii) generate an updated broadcast (or wireless communication) incorporating the telematics data at least every couple of seconds; and/or (iii) direct a transmission of the updated broadcast as often as the broadcast is updated (e.g., every 1-3 seconds) via a mobile device transceiver using data transmission or wireless communication to another computing (or destination) device (such as a nearby vehicle, mobile device, remote server, and/or smart infrastructure processors or servers). As a result, safer travel may be facilitated for another vehicle and/or a second driver based upon computer analysis (at or via the destination device) of the telematics data contained within the updated broadcast and collected or generated by the originating mobile device. The mobile device may include additional, less, or alternate functionality, including that discussed elsewhere herein.

The one or more processors and/or Telematics App executing thereon may be further configured to: analyze the telematics data, and determine or identify that a travel or traffic event exists; generate a message (e.g., a data transmission or wireless communication) associated with the telematics data and/or detailing the type or extent of the travel or traffic event; and/or broadcast the message along with the updated broadcast to other computing devices in the vicinity or otherwise within broadcast range. The travel (or traffic) event may be based upon (and/or determined from telematics data that reveals) that the originating vehicle is experiencing abnormal vehicle, traffic, congestion, road construction, and/or weather conditions.

The telematics data may further include time, braking, acceleration, left turn, right turn, heading, GPS (Global Positioning System) speed, GPS latitude and longitude, gyroscope, battery level, and/or telephone usage information or data of, or associated with, the mobile device and/or moving smart vehicle. The Telematics App further may direct the originating mobile device to periodically "listen" for a broadcast containing telematics data generated from other vehicles or other mobile devices, or use polling techniques to download data or broadcasts from other computing devices, and when such a broadcast is detected or available, download the broadcast and analyze the telematics data contained therein. The Telematics App may further direct the originating mobile device to generate an alert when processor analysis of the telematics data received within a broadcast indicates that a traffic or travel event exists along a route that the originating vehicle is presently traveling, such as a route stored in a vehicle navigation unit.

In another aspect, an originating mobile device configured for telematics data collection, generation, and/or transmission may be provided. The originating mobile device may include one or more processors and/or a Telematics Application ("App") executing therein. The one or more processors and/or Telematics App may be configured to: (1) collect or generate telematics data as a vehicle is traveling, the telematics data including acceleration, braking, gyroscope, compass heading, turning, speed, and/or location-related data; (2) generate a broadcast (or wireless communication or date transmission message) that incorporates the telematics data collected at least once every few seconds (i.e., approximately constantly or otherwise periodically); and/or (3) direct the transmission of each updated broadcast at least once every few (e.g., 2-3) seconds via a transceiver using wireless communication or data transmission to nearby vehicles, mobile devices, and roadside infrastructure (destination devices) to facilitate safer vehicle travel for other vehicles via computer analysis (at the destination devices) of the telematics data of the traveling vehicle collected and transmitted by the mobile device to other nearby computing devices. The originating mobile device may include additional, less, or alternate functionality, including that discussed elsewhere herein.

For instance, the travel (or traffic) event is based upon (and/or determined from telematics data that reveals or indicates) that the originating vehicle is, or may be, experiencing abnormal vehicle, traffic, congestion, road construction, and/or weather conditions. The telematics data may further include time, braking, acceleration, left turn, right turn, heading, GPS (Global Positioning System) speed, GPS latitude and longitude, gyroscope, battery level, and/or telephone usage information or data of, or associated with, the mobile device and/or moving smart vehicle.

The Telematics App may direct the originating mobile device to periodically listen for a broadcast containing telematics data generated from other vehicles or other mobile devices, and when such a broadcast is detected, download the broadcast and analyze the telematics data contained therein. The Telematics App may further direct the originating mobile device to generate an alert when processor analysis of the telematics data received within a broadcast indicates that a traffic or travel event exists along a route that the originating vehicle is presently traveling.

Destination Device Receiving the Telematics Data

In one aspect, a computer-implemented method of using telematics data may be provided. The method may include: (a) receiving telematics data, at or by (1) a destination mobile device associated with a driver (or an associated transceiver of the destination mobile device), or (2) a smart vehicle controller (or an associated transceiver) of a destination vehicle associated with the driver, via wireless communication and/or data transmission (or otherwise via a secure electronic communication network requiring login credential electronic verification), the telematics data being generated by an originating mobile device. The originating mobile device: (i) having a Telematics Application (or "App") installed or stored locally in a non-transitory computer-readable memory unit, and/or (ii) is associated with the driver, the telematics data including acceleration, braking, speed, heading, and location data associated with the operation of an originating vehicle. The method may also include (b) analyzing the telematics data, at or via the destination mobile device or the smart vehicle controller (or a processor associated therewith); (c) determining, at or via the destination mobile device or the smart vehicle controller (or an associated processor), that an abnormal travel condition (or traffic event) exists from the analysis of the telematics data received from the originating mobile device having the Telematics App; and/or (d) when the abnormal travel condition (or traffic event) exists, automatically taking or generating a preventive or corrective action, at or via the destination mobile device or the smart vehicle controller (or an associated processor), that alleviates a negative impact of the abnormal travel condition (or traffic event) on the driver and/or the destination vehicle to facilitate safer and/or more efficient vehicle travel. The method may include additional, less, or alternate functionality, including that discussed elsewhere herein.

For instance, the abnormal condition may be based upon, or otherwise determined from processor analysis of the telematics data received from the originating mobile device having the Telematics App, and that reveals that the originating vehicle is, or may likely be, experiencing high traffic conditions, congestion, road construction, or extreme weather conditions. The telematics data may (1) be generated and/or collected by the originating mobile device (or an associated processor) associated with an originating driver, and (2) include speed, acceleration, deceleration, GPS location, lane information, and/or other data of, or associated with, the originating vehicle. Additionally or alternatively, the telematics data may (1) be generated and/or collected by the originating mobile device (or an associated processor) associated with an originating driver, and (2) include time, braking, acceleration, left turn, right turn, heading, GPS (Global Positioning System) speed, GPS latitude and longitude, gyroscope, battery level, and/or telephone usage information or data of, or associated with, the originating vehicle.

The preventive or corrective action taken may be: (i) generating or determining an alert, at or via the destination mobile device or smart vehicle controller (or an associated processor); (ii) presenting a visual alert, at or via the destination mobile device or smart vehicle controller, on a display or display screen associated with the destination mobile device or smart vehicle controller, respectively; and/or (iii) providing an audio or audible alert, at or via the destination mobile device or smart vehicle controller (or an associated processor). The alert may be presented or provided only after the destination mobile device or smart vehicle controller determines that the abnormal travel condition (or traffic event) is relevant to the destination vehicle, such as by determining that a location of the abnormal travel condition (or traffic event) is in the vicinity of the destination vehicle and/or along a route that the destination vehicle is presently traveling.

The preventive or corrective action taken may be: (a) generating, determining, and/or receiving an alternate travel route that avoids a GPS location of the travel or traffic event, at or via the destination mobile device or smart vehicle controller; and/or (b) presenting the alternative travel route, at or via the destination mobile device or smart vehicle controller, on a display or display screen for use by the driver; and/or providing audio driving directions for the destination vehicle to travel along the alternate route. Additionally or alternatively, the preventive or corrective action taken may be: (c) generating, determining, and/or receiving an alternate travel route that avoids a GPS location of the travel or traffic event, at or via the destination mobile device or smart vehicle controller; and/or (d) automatically directing the destination vehicle to take or follow the alternative travel route, at or via the destination mobile device or smart vehicle controller, wherein the destination vehicle is an autonomous or semi-autonomous vehicle that drives itself (via one or more processors) along the alternate travel route.

The telematics data may be (1) generated and/or collected by the originating mobile device (or the Telematics App executing thereon), and (2) transmitted from a transceiver mounted on, or within, the originating mobile device indirectly or directly to destination mobile device or smart vehicle controller via peer-to-peer (P2P) wireless communication and/or data transmission, or via a secure electronic communication network, the telematics data being repeatedly broadcast from the transceiver mounted on, or within, the originating mobile device at least every few seconds. Additionally or alternatively, the telematics data may be (3) transmitted from the originating mobile device directly to a remote server (such as an insurance provider remote server), and then relayed or transmitted from the remote server to the destination mobile device or smart vehicle controller via wireless communication and/or data transmission; and/or (4) transmitted from the originating mobile device directly to smart infrastructure (such as a smart stop sign, smart street sign, smart toll both, and/or smart road-side equipment, markers, or reflectors), and then relayed or transmitted from the smart infrastructure to the destination mobile device or smart vehicle controller via wireless communication or data transmission. The telematics data may be repeatedly broadcast from the transceiver mounted on, or within, the originating mobile device at least every few seconds, such as when it has new data to transmit, or when driving conditions have changed.

The method may also include, with customer permission or affirmative consent, (i) determining or identifying, by one or more processors associated with an insurance provider remote server, an insured customer having a mobile device configured with the telematics data-based risk mitigation or prevention functionality discussed herein and/or the Telematics App (or is otherwise capability of receiving and then analyzing the telematics data as explained herein); (ii) monitoring, by the one or more processors associated with the remote server, a time amount and/or mileage amount that the insured customer drives an insured vehicle with the risk mitigation or prevention functionality discussed herein, or the Telematics App, enabled and/or executing on their mobile device; and/or (iii) adjusting or modifying, by the one or more processors associated with the remote server, an insurance policy, premium, or discount for the insured customer based upon their usage and/or amount that they use, or employ, the risk mitigation or prevention functionality and/or Telematics App, such as generating a usage-based discount that is tied to an amount that the risk mitigation or prevention functionality (including the capability of receiving and analyzing the telematics data as discussed herein, and/or generating appropriate alerts or recommendations) is used.

In another aspect, a destination computer system configured to use telematics data may be provided. The destination computer system may include: (1) a destination mobile device associated with a driver (or an associated processor and/or transceiver of the destination mobile device), or (2) a smart vehicle controller (or an associated processor and/or transceiver) of a destination vehicle associated with the driver configured to: (a) receive telematics data, via wireless communication and/or data transmission (or otherwise via a secure electronic communication network requiring login credential electronic verification), the telematics data being generated by an originating mobile device and the originating mobile device: (i) having a Telematics Application (or "App") installed or stored locally in a non-transitory computer-readable memory unit, and (ii) is associated with a second driver, the telematics data including acceleration, braking, speed, heading, and location data associated with the operation of an originating vehicle; (b) analyze the telematics data; (c) determine that an abnormal travel condition (or traffic event) exists from the analysis of the telematics data received from the originating mobile device having the Telematics App; (d) determine that the abnormal travel condition (or traffic event) is along a route that the destination vehicle is currently traveling or ahead of a direction of travel of the destination vehicle; and/or (e) when the abnormal travel condition (or traffic event) exists and is along the route (or otherwise ahead) of the destination vehicle, automatically take or generate a preventive or corrective action that alleviates a negative impact of the abnormal travel condition (or traffic event) on the driver and/or the destination vehicle to facilitate safer and/or more efficient vehicle travel. The destination computer system may include additional, less, or alternate functionality, including that discussed elsewhere herein.

Exemplary Smart Vehicle Control System

Figure 9:
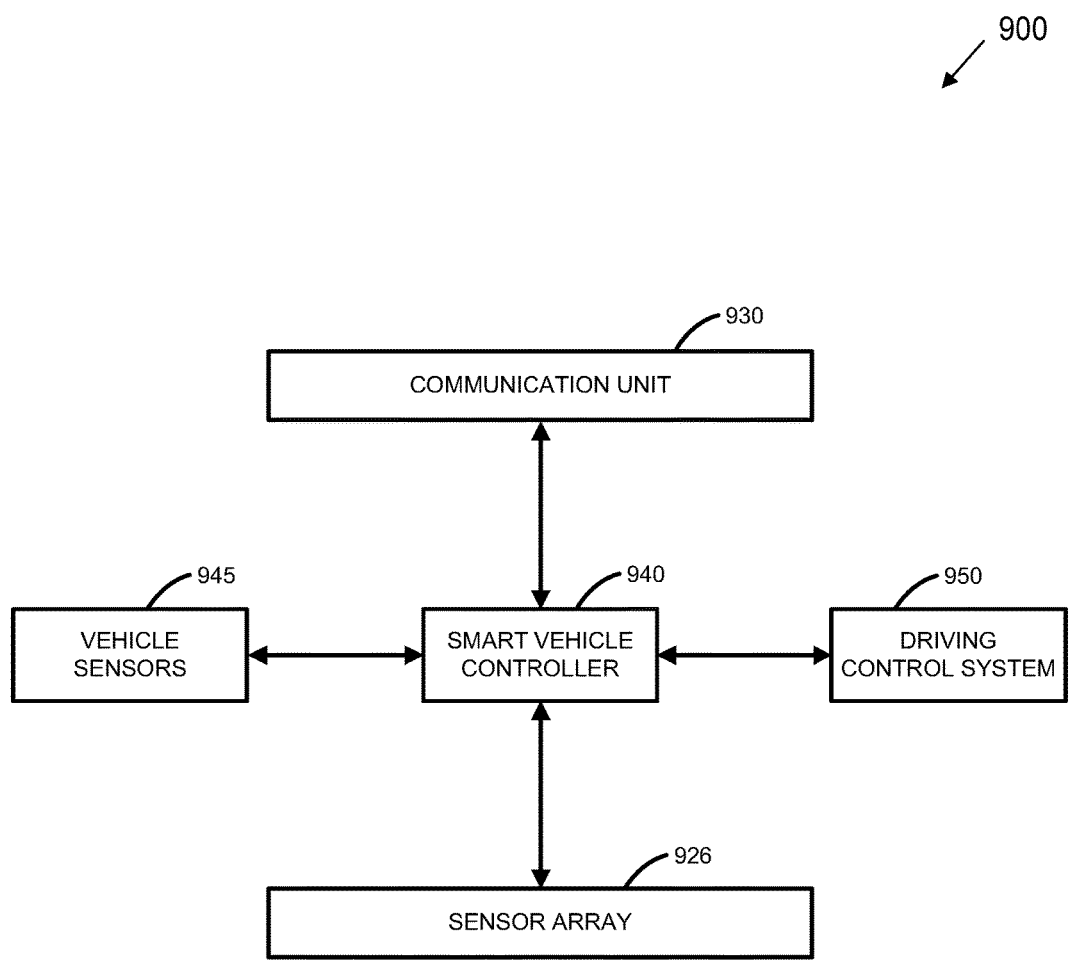
FIG. 9 illustrates a block diagram of an exemplary smart vehicle control system in accordance with an exemplary aspect of the present disclosure.

FIG. 9 illustrates a block diagram of an exemplary smart vehicle control system 900 in accordance with an exemplary aspect of the present disclosure. In the present aspect, smart vehicle control system 900 may be implemented as any suitable computing device, such as a computing device that is integrated as part of a smart vehicle to facilitate autonomous driving and/or other smart driving functions. For example, smart vehicle control system may be integrated as part of one or more vehicles 201.1-202.N, as shown in FIG. 2, to provide such vehicles with such functions. Smart driving functions may include, for example, the generation, receipt, collection, storage, and/or transmission of telematics data, such as previously discussed above with reference to on board computer 114, as shown in FIG. 1.

Smart vehicle control system 900 may include a sensor array 926, a communication unit 930 a smart vehicle controller 940, one or more vehicle sensors 945, and/or a driving control system 950, one or more of which may be configured to communicate with one another to receive data from, and send data to, one another. Smart vehicle control system 900 may include additional, less, or alternate functionality, including that discussed elsewhere herein, and/or discussed with reference to mobile computing devices, remote servers, and/or smart infrastructure.

In an aspect, sensor array 926, communication unit 930, and smart vehicle controller 940 may have a similar architecture, implementation, and/or perform similar functions as sensor array 326, communication unit 330, and controller 340, respectively, as previously discussed above with reference to FIG. 3. Therefore, only differences between sensor array 926, communication unit 930, and smart vehicle controller 940, as shown in FIG. 9 and sensor array 326, communication unit 330, and controller 340, as shown in FIG. 3, will be further discussed herein.

For instance, it will be appreciated that some differences between sensor array 926, communication unit 930, and smart vehicle controller 940, as shown in FIG. 9, and sensor array 326, communication unit 330, and controller 340, as shown in FIG. 3, respectively, may be due to differences between applications and design requirements of mobile computing devices and vehicles. For example, smart vehicle controller 940 may include one or more microprocessors, program memory, RAM, I/O interfaces, etc. However, smart vehicle controller 940 may include faster microprocessors, additional memory, faster memory controllers, etc., than that of controller 340 to account for the additional processing and speed requirements associated with the higher processing functions of vehicles, particularly smart vehicles. To provide another example, smart vehicle controller 940 may include one or more processors specifically designed for adaptive vision processing at high speeds and/or utilizing parallel processing techniques to facilitate autonomous or semi-autonomous driving.

Likewise, sensor array 926 may have additional or alternative sensors and/or meters than sensor array 326. Sensor array 926 may additionally or alternatively include any suitable number and/or type of sensors and/or meters to facilitate autonomous or semi-autonomous driving. Examples of sensors included in sensor array 926 may include, for example, radar systems configured to operate at any suitable number or range of wavelengths (e.g., millimeter-wavelengths), LiDAR, ultrasonic sensors, etc.

Vehicle sensors 945 may include, for example, any suitable number and/or type of sensors and/or meters integrated as part of the vehicle in which smart vehicle control system 900 is installed or otherwise implemented. For example, vehicle sensors 945 may generate one or more sensor metrics or other data that is part of the telematics data that is stored, collected, and/or broadcasted from smart vehicle control system 900 (e.g., via communication unit 930).

In some aspects, vehicle sensors 945 may sample sensor metrics or other information that is included as part of the telematics data, as discussed elsewhere herein, while sensor array 926 may be implemented as one or more sensors associated with autonomous driving functions. Thus, in aspects in which smart vehicle control system 900 is implemented as part of a non-autonomous vehicle, vehicle sensors 945 and sensor array 926 may be implemented as a single sensor array.

Communication unit 930 may be configured to transmit telematics data including one or more sensor metrics or other information generated by vehicle sensors 945 and/or sensor array 926, which may be received by other mobile computing devices, other smart vehicles, smart infrastructure, and/or external computing devices, as discussed elsewhere herein. Additionally or alternatively, communication unit 930 may be configured to receive telematics data from other mobile computing devices, other smart vehicles, smart infrastructure, and/or external computing devices, as discussed elsewhere herein.

When transmitting telematics data, smart vehicle controller 940 may be configured to format the sensor metrics and/or other information generated, collected, and/or measured by vehicle sensors 945 and/or sensor array 926 into a telematics data broadcast, determine whether the telematics data should be updated, and/or broadcast the telematics data. Additionally or alternatively, smart vehicle controller 940 may be configured to analyze the telematics data to identify one or more anomalous conditions (e.g. travel events, traffic events), and/or alerts, to generate one or more messages associated with the telematics data and/or detailing the type and/or extent of an identified anomaly and/or alert, etc.

Furthermore, smart vehicle controller 940 may be configured to broadcast or otherwise direct a transmission of the message via data transmission and/or wireless communication (e.g., via communication unit 930) to another computing device (such as a mobile computing device, another vehicle, a remote server, smart infrastructure, etc.). As further discussed herein, devices receiving the telematics data and/or message may utilize the telematics data to perform various functions, issue alerts to drivers, etc. In this way, the telematics data and/or messages transmitted by smart vehicle control system 900 may facilitate safer travel for another vehicle and/or another driver.

Similar to the other devices described above (e.g., mobile computing device 300), when receiving telematics data, smart vehicle controller 940 may be configured to perform various functions such as issuing alerts to drivers when the telematics data contains a warning message and/or identifying an anomalous condition by analyzing the received telematics data.

Driving control system 950 may be implemented with any suitable number and/or type of driving controllers to control the direction, movement, and/or speed of the vehicle in which smart vehicle control system 900 is installed. For example, driving control system 950 may include various drive-by-wire interfaces to facilitate controlling the speed of the vehicle and to turn the vehicle without user input. To provide an additional example, driving control system may include various braking controllers and/or transmission controllers to slow the vehicle and to shift the vehicle into different gears.

In accordance with one aspect, smart vehicle controller 940 may communicate with one or more components of driving control system 950 in response to telematics data, information, and/or messages received via communication unit 930. For example, if the telematics data indicates a road hazard at a certain location and/or in a certain road lane, then smart vehicle controller 940 may issue one or more commands to driving control system 950 to steer the vehicle into a clear lane, thus avoiding the road hazard.

Driving control system 950 may include different types of feedback components and/or control systems based upon the type of vehicle in which smart vehicle control system 900 is implemented or installed. For example, driving control system 950 may include various interfaces and/or control systems to facilitate autonomous driving in conjunction with smart vehicle controller 940. But if smart vehicle control system 900 is implemented in a non-autonomous vehicle, driving control system may work in conjunction with smart vehicle controller 940 to receive one or more signals and/or data associated with traditional driving functions (e.g., manual acceleration, steering, braking, etc.).

Regardless of the type of vehicle in which smart vehicle control system 900 is implemented, smart vehicle controller 900 may work in conjunction with driving control system 950 to support any suitable number and/or type of driver feedback. To provide this feedback, driving control system 950 may include any suitable number and/or type of displays, user interfaces, speakers, buzzers, etc.

For example, driving control system 950 may include various feedback components to provide visual and/or auditory feedback regarding the operation of the vehicle and/or information regarding anomalous conditions, alerts, warnings, recommendations, etc., which may be based upon an analysis of telematics data. Again, the telematics data may be received from another computing device (e.g., via communication unit 930) and/or generated and analyzed locally at smart vehicle control system 900.

To provide another example, smart vehicle controller 940 may include one or more memory units configured to store cartographic and/or map data. In response to user input received via a user interface implemented by driving control system 950, smart vehicle controller 940 may generate, calculate, and/or display travel routes, which may provide navigational guidance to a driver. Furthermore, smart vehicle controller 940 may perform functions associated with the determination of whether an identified anomaly (e.g., a traffic event, travel event, abnormal condition, etc.), which has been determined from an analysis of received telematics data from another device, is relevant to the vehicle in which smart vehicle control system 900 is implemented.

This determination of relevance may be made, for example, by comparing a location (e.g., geographic coordinates included in a telematics data transmission) to the current location of the vehicle in which smart vehicle control system 900 is implemented to determine whether the locations are within a threshold distance of one another. The determination may also be made, for example, when the identified anomaly or other abnormal condition is located along a current travel route (e.g., ahead by some threshold distance in a direction of travel on the same road in which the vehicle is moving). If so, aspects include smart vehicle controller 940 automatically performing various preventative and/or corrective actions based upon how the relevance of the identified anomaly is determined. For example, smart vehicle controller 940 may issue a visual and/or audible alert via driving control system 950, calculate and display a new travel route via driving control system 950 that avoids the location of the identified event, etc.

In some aspects, the preventative and/or corrective actions may be issued only when it is determined that an identified anomaly is relevant, and is otherwise not issued. For example, aspects include an identified anomaly that is not along a current route for the vehicle in which smart vehicle control system 900 is implemented not causing an alarm to be sounded and/or the route to be adjusted, even if the location of the anomaly is otherwise nearby. In this way, the preventive or corrective action may alleviate or avoid a negative impact of the abnormal travel condition on the driver and/or the vehicle in which smart vehicle control system 900 is implemented to facilitate safer or more efficient vehicle travel. Additional details of the preventive or corrective action that may be facilitated by smart vehicle control system 900 (or another suitable computing system) are further discussed below with reference to FIG. 10.

Again, as discussed elsewhere herein, anomalous condition may be based upon (and/or determined from telematics data that reveals) abnormal traffic conditions, congestion, road construction, and/or weather conditions, etc.

Exemplary End-User: Receiving & Analyzing Telematics Data

Figure 10:
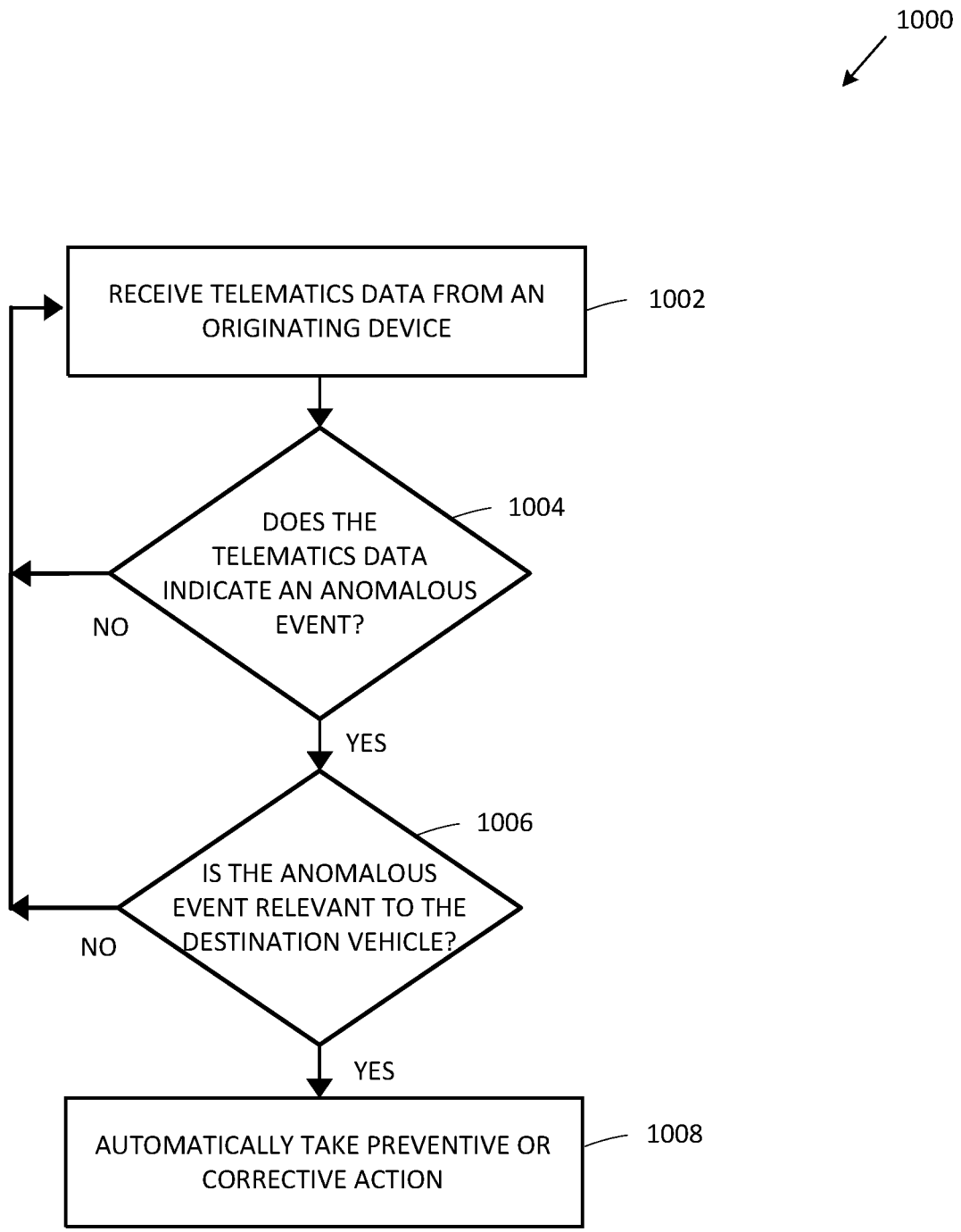
FIG. 10 illustrates an exemplary computer-implemented method of utilizing telematics data at a destination device that is received from an originating device in accordance with an exemplary aspect of the present disclosure.

FIG. 10 illustrates an exemplary method 1000 of utilizing telematics data at a destination device that is received from an originating device in accordance with an exemplary aspect of the present disclosure. In the present aspect, the method 1000 may be implemented by any suitable destination computing device (e.g., mobile computing devices 204.1 and 204.2, as shown in FIG. 2, mobile computing device 300, as shown in FIG. 3, smart vehicle controller 940, as shown in FIG. 9, etc.). Method 1000 may include additional, less, or alternate steps, including those discussed elsewhere herein and/or discussed with reference to mobile computing devices, remote servers, and/or smart infrastructure.

For example, in aspects in which the method 1000 is performed by a mobile computing device, the method 1000 may be performed by one or more processors, applications, and/or routines, such as any suitable portion of controller 340, software applications 344, and/or software routines 352, for example, as shown in FIG. 3. To provide another example, in aspects in which the method 1000 is performed by a smart vehicle controller, the method 1000 may be performed by any suitable combination of one or more hardware, processors, applications, and/or routines working in conjunction with and/or implemented by the smart vehicle controller (e.g., communication unit 930, smart vehicle controller 940, driving control system 950, etc.).

The method 1000 may start when one or more processors receive telematics data from an originating device (block 1002). The originating device may include for example, a mobile computing device located in an originating vehicle or a smart vehicle controller located in the originating vehicle. In either case, the originating device may sample, generate, measure, and/or transmit the telematics data, which may include, for example, latitude and longitude coordinates or another indication of the originating device (e.g., GPS coordinates), an acceleration, braking, speed, and/or heading of the originating vehicle, etc.

The method 1000 may include one or more processors associated with a destination device determining whether the telematics data indicates an anomalous event (block 1004). Similar to the originating device, the destination device may include for example, a mobile computing device located in a destination vehicle, or a smart vehicle controller located in the destination vehicle. In either case, the destination device may analyze the telematics data received from the originating device and determine whether an abnormal condition exists based upon such an analysis (block 1004). Again, the anomalous event may include, for example, an anomalous travel or traffic event, extreme weather conditions, high traffic conditions, traffic congestion, road construction, etc.

In one aspect, the destination device may determine whether an anomalous condition or event exists based upon any suitable analysis techniques (block 1004). For example, the destination device may store or access data (e.g., via communications with an external computing device) that includes an indication of speed limits on various roads, typical travel times on various roads, and/or typical traffic flow rates on various roads at different times of the day. The destination device may correlate the location of the destination device, which may be included in the telematics data, to a particular road. The destination device may then determine, based upon the speed of the originating vehicle at that location, whether the telematics data indicates an anomalous traffic event (block 1004).

For example, if an originating device is travelling at a speed on a road that is greater than a threshold amount below the posted speed limit for a threshold duration of time, then an anomalous condition may be identified at that location. To provide another example, if an originating device is travelling on a road at a particular speed that is greater than a threshold speed below a typical traffic speed associated with that road, then an anomalous condition may be identified at that location.

Furthermore, aspects include the destination device determining whether an anomalous event exists via matching one or more sensor metrics included in the telematics data to those indicative of a vehicle collision, crash, rollover, etc. (block 1004). For example, accelerometer metrics may indicate a sudden deceleration of the originating vehicle within a window of time that is consistent with a collision.

Additionally or alternatively, aspects include the destination device determining whether an anomalous event exists via an analysis of image and/or video data included in the telematics data (block 1004). For example, image and/or video data included in the telematics data may be analyzed via one or more object recognition and/or image recognition techniques to determine whether an object matches a hazardous profile (e.g., deer or other animals, lanes being blocked, etc.). If so, aspects include an anomalous condition being identified at that location.

Furthermore, aspects include the destination device receiving an alert, indication, and/or message regarding an anomalous condition that has already been identified by the originating device (block 1004). For example, the originating device may include, with the telematics data, an indication of a type of anomalous condition, when it was detected, and its location. The destination device may then receive the telematics data to identify the anomalous event at that location (block 1006).

Regardless of how the destination device identifies an anomalous condition, aspects include method 1000 continuing to determine whether the anomalous event is relevant to the destination vehicle (block 1006). Otherwise, method 1000 may revert back to continuing to receive the telematics data from the originating device (block 1002).

The method 1000 may include one or more processors associated with a destination device determining whether the anomalous event is relevant to the destination vehicle (block 1006). As discussed above with reference to FIG. 9, this determination may be made in accordance with any suitable techniques. For example, the destination device may compare the location of the anomalous event to the location of the destination vehicle. If these two locations are within a threshold distance of one another, the destination vehicle may identify the anomalous condition as a relevant one. To provide another example, the location of the anomalous condition may be compared to a route or road upon which the destination vehicle is currently traveling. If the location of the anomalous event is on the road or along the route on which the destination vehicle is travelling (e.g., ahead and in a direction of travel on the same road in which the vehicle is moving), then the destination vehicle may identify the anomalous condition as a relevant one.

If the anomalous event is relevant to the destination vehicle, aspects include the destination vehicle taking preventive or corrective action (block 1008). Otherwise, method 1000 may revert back to continuing to receive the telematics data from the originating device (block 1002).

The method 1000 may include one or more processors associated with a destination device automatically taking preventative or corrective action when the anomalous event is relevant to the destination vehicle (block 1008). This preventative or corrective action may be based upon, for example, the type of anomalous event, the type of destination vehicle, and/or the capabilities of the destination vehicle (block 1008).

For example, upon determining that the anomalous event is relevant to the destination vehicle, the destination vehicle may generate an alert, present a visual alert, provide an audible alert, present an alternative travel route that avoids a location of the anomalous event (e.g., the GPS location of the anomalous event), and/or provide audio driving directions for the destination vehicle to travel along the alternate travel route (block 1008).

To provide another example, if the destination vehicle is an autonomous (or semi-autonomous) vehicle, upon determining that the anomalous event is relevant to the destination vehicle, the destination vehicle may not only generate an alternate travel route that avoids a location of the anomalous event, but may additionally automatically direct the destination vehicle to take the alternative travel route by driving itself along the alternate route (block 1008).

In this way, method 1000 may alleviate a negative impact of the abnormal event upon the driver of the destination vehicle or the destination vehicle itself to facilitate safer and/or more efficient travel.

Exemplary Method of Utilizing Telematics Data

In one aspect, a computer-implemented method of using telematics data at a first vehicle that receives telematics data associated with a second vehicle is provided. The method may include one or more processors of a destination mobile computing device or a smart vehicle controller associated with the first vehicle and a first driver (1) receiving telematics data that is generated by an originating mobile computing device associated with the second vehicle and a second driver, the originating mobile computing device executing a Telematics Application (or "App") installed or stored thereon to facilitate the generation of the telematics data; (2) analyzing the telematics data; and (3) determining whether an abnormal travel or traffic event exists from the analysis of the telematics data. The telematics data may include data related to a location of the second vehicle and an acceleration, braking, speed, and heading of the second vehicle. Furthermore, the method may include, when the abnormal travel or traffic event exists, the destination mobile computing device or the smart vehicle controller associated with the first vehicle automatically taking a preventive or corrective action, which alleviates a negative impact of the abnormal travel or traffic event on the first driver or the first vehicle to facilitate safer or more efficient travel.

The abnormal condition may be associated with the telematics data received from the originating mobile computing device and may also indicate, for example, that the originating vehicle is experiencing high traffic conditions, congestion, road construction, or extreme weather conditions, etc.

The telematics data may also include data indicative of information associated with the second vehicle, the data including one or more of a speed, acceleration, deceleration, Global Positioning System (GPS) location, time, braking, data indicative of the second vehicle turning, GPS speed, GPS latitude and longitude, a battery level of the originating mobile computing device, telephone usage information associated with the originating mobile computing device, angular velocity, and road lane information associated with the second vehicle.

Additionally or alternatively, the one or more processors of the destination mobile computing device or the smart vehicle controller may automatically take a preventive or corrective action such as generating an alert, presenting a visual alert, and providing an audible alert. Aspects include the alert being generated, presented, and/or provided, for example, only after the destination mobile computing device or smart vehicle controller determines that the abnormal travel or traffic event is relevant to the first vehicle by determining that a location of the abnormal travel or traffic event is in the vicinity of, or predetermined distance of, the first vehicle or along a route that the first vehicle is presently traveling.

Additionally or alternatively, the one or more processors of the destination mobile computing device or the smart vehicle controller may automatically take a preventive or corrective action such as presenting an alternative travel route that avoids a Global Positioning System (GPS) location of the travel or traffic event, providing audio driving directions for the destination vehicle to travel along the alternate travel route. In aspects in which the first vehicle is an autonomous or semi-autonomous vehicle that drives itself, the preventive or corrective action may include generating an alternate travel route that avoids a Global Positioning System (GPS) location of the travel or traffic event and automatically directing the first vehicle to take the alternative travel route.

Furthermore, the method may include the telematics data being (1) generated and/or collected by the originating mobile computing device, and (2) transmitted from the originating mobile computing device indirectly or directly the destination mobile computing device or the smart vehicle controller associated with the first vehicle via (1) peer-to-peer (P2P) wireless communication or data transmission, or (2) via a secure electronic communication network, the telematics data being broadcasted from the originating mobile computing device in accordance with a periodic recurring schedule.

Additionally or alternatively, the telematics data may be transmitted from the originating mobile computing device directly to a remote server, the remote server relaying the telematics data to the destination mobile computing device or the smart vehicle controller associated with the first vehicle.

In other aspects, the telematics may be transmitted from the originating mobile computing device directly to a smart infrastructure via a broadcast from the originating mobile computing device in accordance with a periodic recurring schedule, the smart infrastructure relaying the telematics data to the destination mobile computing device or the smart vehicle controller associated with the first vehicle.

Still further, the method may include identifying the second driver as an insured customer having the originating mobile computing device configured with the telematics data-based risk mitigation or prevention functionality and, once identified, adjusting an insurance policy, premium, or discount for the insured customer based upon the insured customer having the originating mobile computing device equipped with or configured to have the telematics data-based risk mitigation or prevention functionality.

Additionally or alternatively, once the insured customer is identified, the method may include monitoring a usage amount that the insured customer drives the second vehicle while the telematics data-based risk mitigation or prevention functionality is performed on the originating mobile computing device, and adjusting an insurance policy, premium, or discount for the insured customer associated with driving the second vehicle based upon the usage amount, which may include generating a usage-based discount that is tied to an amount that the capability of receiving and analyzing the telematics data, or generating appropriate alerts or recommendations, is used.

Destination Device Receiving the Telematics Data

In another aspect, a destination computer system is provided. The destination computer system may be configured to use telematics data and included a destination mobile computing device associated with a first driver, or a smart vehicle controller of a destination vehicle associated with the first driver, either or both of which may be configured to: (1) receive telematics data; (2) determine whether an abnormal travel condition or traffic event exists from an analysis of the telematics data received from the originating mobile computing device; and (3) determine whether the abnormal travel condition or traffic event is along a route that the destination vehicle is currently traveling or ahead of a direction of travel of the destination vehicle. The telematics data may be generated by an originating mobile computing device associated with a second driver and an originating vehicle, the originating mobile computing device executing a Telematics Application (or "App") installed or stored thereon to facilitate the generation of the telematics data. The telematics data may include data related to a location of the originating vehicle and an acceleration, braking, speed, and heading of the originating vehicle.

Furthermore, the destination mobile computing device and/or smart vehicle controller may be configured to, when it is determined that the abnormal travel condition or traffic event exists and is along the route of the destination vehicle, automatically take or generate a preventive or corrective action that alleviates or avoids a negative impact of the abnormal travel condition or traffic event on the driver or the destination vehicle to facilitate safer or more efficient vehicle travel.

The abnormal condition may be associated with the telematics data received from the originating mobile computing device and may also indicate that the originating vehicle is experiencing high traffic conditions, congestion, road construction, or extreme weather conditions.

The telematics data may also include data indicative of information associated with the originating vehicle, the data including one or more of a deceleration, Global Positioning System (GPS) location, time, braking, data indicative of the originating vehicle turning, GPS speed, GPS latitude and longitude, a battery level of the originating mobile computing device, telephone usage information associated with the originating mobile computing device, angular velocity, and road lane information associated with the originating vehicle.

Additionally or alternatively, the destination mobile computing device and/or smart vehicle controller may be configured to take preventive or corrective action such as generating an alert, presenting a visual alert, providing an audible alert, presenting an alternative travel route that avoids a Global Positioning System (GPS) location of the travel or traffic event, and providing audio driving directions for the destination vehicle to travel along the alternate route.

Aspects include the preventive or corrective action taking place, for example, only after the destination mobile computing device or smart vehicle controller determines that the abnormal travel or traffic event is relevant to the destination vehicle by determining that a location of the abnormal travel or traffic event is in the vicinity of, or predetermined distance of, the destination vehicle or along a route that the destination vehicle is presently traveling. In aspects in which the destination vehicle is an autonomous or semi-autonomous vehicle that drives itself, the preventive or corrective action may include generating an alternate travel route that avoids a Global Positioning System (GPS) location of the travel or traffic event and automatically directing the destination vehicle to take the alternative travel route.

Furthermore, the originating mobile computing device may generate or collect the telematics data and transmitted the telematics data directly to smart infrastructure via a broadcast that is in accordance with a periodic recurring schedule. The smart infrastructure may include one or more of a smart stop sign, smart street sign, smart toll both, or smart road-side equipment, markers, or reflectors, etc. In aspects in which the originating mobile computing device communicates with smart infrastructure, the smart infrastructure may relay the telematics data to the destination mobile computing device or the smart vehicle controller associated with the destination vehicle.

Additional Considerations

With the foregoing, an insurance customer may opt-in to a rewards, insurance discount, or other type of program. After the insurance customer provides their affirmative consent, an insurance provider telematics application and/or remote server may collect telematics and/or other data (including image or audio data) associated with insured assets, including before, during, and/or after an insurance-related event or vehicle collision. In return, risk averse drivers, and/or vehicle owners may receive discounts or insurance cost savings related to auto, home, life, and other types of insurance from the insurance provider.

In one aspect, telematics data, and/or other data, including the types of data discussed elsewhere herein, may be collected or received by an insured's mobile device or smart vehicle, a Telematics App (including those discussed herein), and/or an insurance provider remote server, such as via direct or indirect wireless communication or data transmission from a Telematics App running on the insured's mobile device, after the insured or customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, etc., aspects include any suitable number of mobile computing devices, vehicles, etc. For example, aspects include an external computing device receiving telematics data and/or geographic location data from a large number of mobile computing devices (e.g., 100 or more), and issuing alerts to those mobile computing devices in which the alerts are relevant in accordance with the various techniques described herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method of using telematics data at a destination computing device that is associated with a destination driver, comprising:

receiving, via the destination computing device, telematics data including acceleration, braking, speed, compass heading, and location-related data associated with an operation of the originating vehicle, the telematics data being sampled by one or more sensors that are incorporated as part of an originating computing device when the one or more sensors indicate that the originating computing device is stationary with respect to an originating vehicle and is located within the originating vehicle;

identifying, via the destination computing device, an abnormal travel condition or traffic event based upon an analysis of the received telematics data;

determining, via the destination computing device, that the abnormal travel condition or traffic event is relevant to the destination vehicle when (i) a location of the originating computing device, based upon the telematics data, is within a threshold distance of a current location of the destination computing device, or (ii) the abnormal travel condition or traffic event is located along a route upon which the destination vehicle is presently traveling; and when the abnormal travel condition or traffic event is found to be relevant to the destination vehicle or the destination driver, (1) at least one of
   (i) providing, via the destination computing device, a graphical user interface (GUI) including a display of
      (a) an indication of a description of the abnormal travel condition or traffic event, the indication of the description of the abnormal travel condition or traffic event including at least one of a text indication of the description or a graphical indication of the description, and
      (b) an indication of a location of the abnormal travel condition or traffic event, the indication of the location of the abnormal travel condition or traffic event including at least one of a text indication of the location, a graphical indication of the location, or a map indicating the location, or
   (ii) automatically taking at least one other preventive or corrective action, via the destination computing device, to affect driving of the destination vehicle so as to alleviate a negative impact of the abnormal travel condition or traffic event, and
(2) displaying, via the destination computing device, insurance policy pricing adjustment information associated with the destination driver that is based upon a driver risk due to the determined abnormal travel condition or traffic event so as to promote or reward risk averse behavior and safer driving via the displayed insurance policy pricing adjustment information.

2. The computer-implemented method of claim 1, wherein the telematics data indicates that the originating computing device is experiencing one or more of high traffic conditions, congestion, road construction, and extreme weather conditions.

3. The computer-implemented method of claim 1, wherein the telematics data is indicative of one or more of Global Positioning System (GPS) speed, GPS location, lane information associated with the originating vehicle, time, turning associated with the originating vehicle, GPS latitude and longitude, battery level associated with the originating vehicle, and telephone usage information associated the originating vehicle.

4. The computer-implemented method of claim 1, comprising generating an alternate travel route that avoids the location of the abnormal travel condition or traffic event, and presenting the alternate travel route via the GUI.

5. The computer-implemented method of claim 1, wherein the telematics data is received from the originating computing device via peer-to-peer (P2P) wireless communications.

6. The computer-implemented method of claim 1, wherein the telematics data is received from the originating computing device via a remote server.

7. The computer-implemented method of claim 1, wherein the insurance policy pricing adjustment information associated with the destination driver includes an insurance policy, premium, or discount based upon the at least one of (i) providing, via the destination computing device, the GUI or (ii) automatically taking, via the destination computing device, the at least one other preventive or corrective action to alleviate the negative impact of the abnormal travel condition or traffic event.

8. A destination computing device associated with a destination vehicle and a destination driver, comprising:
   a communication unit configured to receive telematics data from an originating computing device that is associated with an originating vehicle, the telematics data including acceleration, braking, speed, compass heading, and location-related data associated with an operation of the originating vehicle, the telematics data being sampled by one or more sensors that are incorporated as part of the originating computing device when the one or more sensors indicate that the originating computing device is stationary with respect to the originating vehicle and is located within the originating vehicle;
   one or more processors configured to:
      identify an abnormal travel condition or traffic event based upon an analysis of the received telematics data;
      determine that the abnormal travel condition or traffic event is relevant to the destination vehicle when (i) a location of the originating computing device, based upon the telematics data, is within a threshold distance of a current location of the destination computing device, or (ii) the abnormal travel condition or traffic event is located along a route upon which the destination vehicle is presently traveling; and
      when the abnormal travel condition or traffic event is found to be relevant to the destination vehicle or the destination driver, automatically take at least one preventive or corrective action to alleviate a negative impact of the abnormal travel condition or traffic event, the at least one preventive or corrective action including at least one of providing a graphical user interface (GUI) to alert the destination driver or at least one other preventive or corrective action that affects driving of the destination vehicle; and
   a display configured to at least one of
      (i) provide the GUI, the GUI including a screen showing
         (a) an indication of a description of the abnormal travel condition or traffic event, the indication of the description of the abnormal travel condition or traffic event including at least one of a text indication of the description or a graphical indication of the description, and
         (b) an indication of a location of the abnormal travel condition or traffic event, the indication of the location of the abnormal travel condition or traffic event including at least one of a text indication of the location, a graphical indication of the location, or a map indicating the location, or
      (ii) present insurance policy pricing adjustment information associated with the destination driver that is based upon a driver risk due to the determined abnormal travel condition or traffic event so as to promote or reward risk averse behavior and safer driving via the displayed insurance policy pricing adjustment information.

9. The destination computing device of claim 8, wherein the telematics data indicates that the originating computing device is experiencing one or more of high traffic conditions, congestion, road construction, and extreme weather conditions.

10. The destination computing device of claim 8, wherein the telematics data is indicative of one or more of speed associated with the originating vehicle, Global Positioning System (GPS) speed, GPS location, lane information associated with the originating vehicle, time, turning associated with the originating vehicle, heading associated with the originating vehicle, GPS latitude and longitude, battery level associated with the originating vehicle, and telephone usage information associated the originating vehicle.

11. The destination computing device of claim 8, wherein the one or more processors are configured to take a preventive or corrective action that includes generating an alternate travel route that avoids the location of the abnormal travel condition or traffic event, and wherein the display is configured to present the alternate travel route.

12. The destination computing device of claim 8, wherein the communication unit is further configured to receive the telematics data from the originating computing device via peer-to-peer (P2P) wireless communications.

13. The destination computing device of claim 8, wherein the communication unit is further configured to receive the telematics data from the originating computing device via a remote server.

14. The destination computing device of claim 8, wherein the insurance policy pricing adjustment information associated with the destination driver includes an insurance policy, premium, or discount based upon the destination driver using the destination computing device to automatically take the at least one preventive or corrective action to alleviate the negative impact of the abnormal travel condition or traffic event.

15. A tangible, non-transitory, computer-readable medium associated with a destination computing device that is associated with a destination vehicle and a destination driver, the computer-readable medium storing instructions that, when executed by one or more processors of the destination computing device, cause the destination computing device to:
receive telematics data from an originating computing device that is associated with an originating vehicle, the telematics data including acceleration, braking, speed, compass heading, and location-related data associated with an operation of the originating vehicle, the telematics data being sampled by one or more sensors that are incorporated as part of the originating computing device when the one or more sensors indicate that the originating computing device is stationary with respect to the originating vehicle and is located within the originating vehicle;
identify an abnormal travel condition or traffic event based upon an analysis of the received telematics data;
determine that the abnormal travel condition or traffic event is relevant to the destination vehicle when (i) a location of the originating computing device, based upon the telematics data, is within a threshold distance of a current location of the destination computing device, or (ii) the abnormal travel condition or traffic event is located along a route upon which the destination vehicle is presently traveling; and
when the abnormal travel condition or traffic event is found to be relevant to the destination vehicle or the destination driver,
(1) at least one of
(i) provide a graphical user interface (GUI) including a display of
(a) an indication of a description of the abnormal travel condition or traffic event, the indication of the description of the abnormal travel condition or traffic event including at least one of a text indication of the description or a graphical indication of the description, and
(b) an indication of a location of the abnormal travel condition or traffic event, the indication of the location of the abnormal travel condition or traffic event including at least one of a text indication of the location, a graphical indication of the location, or a map indicating the location, or
(ii) automatically cause at least one other preventive or corrective action to affect driving of the destination vehicle so as to alleviate a negative impact of the abnormal travel condition or traffic event, and
(2) present insurance policy pricing adjustment information associated with the destination driver that is based upon a driver risk due to the determined abnormal travel condition or traffic event so as to promote or reward risk averse behavior and safer driving via the displayed insurance policy pricing adjustment information.

16. The tangible, non-transitory, computer-readable medium of claim 15, wherein the telematics data indicates that the originating computing device is experiencing one or more of high traffic conditions, congestion, road construction, and extreme weather conditions.

17. The tangible, non-transitory, computer-readable medium of claim 15, wherein the telematics data is indicative of one or more of speed associated with the originating vehicle, Global Positioning System (GPS) speed, GPS location, lane information associated with the originating vehicle, time, turning associated with the originating vehicle, heading associated with the originating vehicle, GPS latitude and longitude, battery level associated with the originating vehicle, and telephone usage information associated the originating vehicle.

18. The tangible, non-transitory, computer-readable medium of claim 15, wherein the instructions, when executed by the one or more processors, cause the destination computing device to take a preventive or corrective action that includes generating an alternate travel route that avoids the location of the abnormal travel condition or traffic event, and presenting the alternate travel route.

19. The tangible, non-transitory, computer-readable medium of claim 15, wherein the instructions, when executed by the one or more processors, further cause the destination computing device to receive the telematics data from the originating computing device via one of (i) peer-to-peer (P2P) wireless communications, or (ii) via a remote server.

20. The tangible, non-transitory, computer-readable medium of claim 15, wherein the instructions, when executed by the one or more processors, further cause the destination computing device to display the insurance policy pricing adjustment information associated with the destination driver including an insurance policy, premium, or discount based upon the at least one of (i) providing the GUI or (ii) automatically causing the at least one other preventive or corrective action to alleviate the negative impact of the abnormal travel condition or traffic event.

* * * * *